US012726383B2

(12) United States Patent
Tang et al.

(10) Patent No.: US 12,726,383 B2
(45) Date of Patent: Sep. 1, 2026

(54) COMMUNICATION METHOD AND COMMUNICATION APPARATUS

(71) Applicant: HUAWEI TECHNOLOGIES CO., LTD., Shenzhen (CN)

(72) Inventors: Xin Tang, Shanghai (CN); Kun Wang, Shenzhen (CN); Pengpeng Li, Shanghai (CN); Zhenyu Wang, Shanghai (CN); Tong Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 730 days.

(21) Appl. No.: 18/183,180

(22) Filed: Mar. 14, 2023

(65) Prior Publication Data

US 2023/0216710 A1 Jul. 6, 2023

Related U.S. Application Data

(63) Continuation of application No. PCT/CN2021/118092, filed on Sep. 14, 2021.

(30) Foreign Application Priority Data

Sep. 23, 2020 (CN) ......................... 202011007188.4

(51) Int. Cl.
*H04L 25/02* (2006.01)
*H04W 84/12* (2009.01)

(52) U.S. Cl.
CPC ......... *H04L 25/0204* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,523,246 | B1 | 12/2019 | Zhang et al. |
| 2003/0050085 | A1 | 3/2003 | Peluso et al. |
| 2005/0159123 | A1 | 7/2005 | Lu |
| 2008/0165715 | A1 | 7/2008 | Liu |
| 2010/0064152 | A1 | 3/2010 | Kosaka |

(Continued)

FOREIGN PATENT DOCUMENTS

| | | | |
|---|---|---|---|
| CN | 1988434 | A | 6/2007 |
| CN | 101031901 | A | 9/2007 |

(Continued)

OTHER PUBLICATIONS

Zhang Yu eal., Codebook Based MIMO Precoding in LTE System and Reconnaissance Scheme. Communication Countermeasures, vol. 32 No. 1, Mar. 2013, 5 pages.

*Primary Examiner* — Christopher T Wyllie

(57) ABSTRACT

This disclosure provides a communication method and a communication apparatus. The method is applied to a software baseband architecture receiver, and the method includes: receiving a first signal; allocating a processing resource to the first signal based on parameter information of the first signal, where the processing resource includes at least one of a processing algorithm for channel estimation (CE) or a processing algorithm for multiple-input multiple-output (MIMO) detection; and performing CE and MIMO detection on the first signal based on the processing resource.

4 Claims, 14 Drawing Sheets

(56) References Cited

U.S. PATENT DOCUMENTS

| | | | | |
|---|---|---|---|---|
| 2011/0069776 | A1* | 3/2011 | Huang | H04L 25/0204 375/267 |
| 2012/0202507 | A1 | 8/2012 | Zhang et al. | |
| 2013/0343251 | A1 | 12/2013 | Zhang | |
| 2014/0099900 | A1 | 4/2014 | Cili | |
| 2014/0161210 | A1 | 6/2014 | Chen et al. | |
| 2014/0328178 | A1 | 11/2014 | Haberland et al. | |
| 2016/0087697 | A1 | 3/2016 | Gopalan | |
| 2017/0093466 | A1 | 3/2017 | Nieman | |
| 2017/0168792 | A1 | 6/2017 | Bhattacharya et al. | |
| 2018/0006670 | A1 | 1/2018 | Liu et al. | |
| 2019/0149362 | A1 | 5/2019 | Jalloul et al. | |
| 2020/0029315 | A1* | 1/2020 | Lin | H04W 52/0216 |
| 2020/0137684 | A1 | 4/2020 | Mattela et al. | |
| 2022/0053553 | A1* | 2/2022 | Li | H04W 72/23 |
| 2023/0216710 | A1* | 7/2023 | Tang | H04L 25/022 370/252 |

FOREIGN PATENT DOCUMENTS

| | | | |
|---|---|---|---|
| CN | 101043479 | A | 9/2007 |
| CN | 102611652 | A | 7/2012 |
| CN | 103428117 | A | 12/2013 |
| CN | 103685086 | A | 3/2014 |
| CN | 104980378 | A | 10/2015 |
| CN | 105589506 | A | 5/2016 |
| CN | 106411332 | A | 2/2017 |
| CN | 111356151 | A | 6/2020 |
| EP | 4072087 | A1 | 10/2022 |
| JP | 2012204911 | A | 10/2012 |
| WO | 2013166984 | A1 | 11/2013 |
| WO | 2017101811 | A1 | 6/2017 |

* cited by examiner

COMMUNICATION METHOD AND COMMUNICATION APPARATUS

CROSS-REFERENCE TO RELATED APPLICATIONS

This is a continuation of International Application No. PCT/CN2021/118092, filed on Sep. 14, 2021, which claims priority to Chinese Patent Application No. 202011007188.4, filed on Sep. 23, 2020. The disclosures of the aforementioned applications are herein incorporated by reference in their entireties.

TECHNICAL FIELD

This relates to the communication field, and more specifically, to a communication method and a communication apparatus.

BACKGROUND

In a networking scenario of a wireless local area network (WLAN), one access point (AP) may be associated with a plurality of stations (STAs). The AP and the STA perform wireless communication through a mechanism defined in the 802.11 series protocols. Data information from a MAC layer is modulated by the AP or the STA into an orthogonal frequency division multiplexing (OFDM) signal for sending and receiving at an air interface. Sending and receiving of the foregoing signal may be implemented by a receiver functional module of a WLAN chip on an AP side or a STA side.

Wi-Fi protocols have evolved into a plurality of IEEE 802.11 series protocol versions. The WLAN chip needs to support framing, deframing, sending, and receiving of data packets in a plurality of protocol versions. Furthermore, an immediate response scenario defined by the Wi-Fi protocol poses a further challenge to a processing delay of the chip. In addition, the WLAN chip further needs to support received signals with a plurality of processing specifications (such as a bandwidth, an antenna, and a user). Besides, because of power consumption of a chip, cost constraints of a chip, and the like, there is a high requirement on a chip architecture design. Currently, it is difficult for a common chip structure to meet the foregoing requirements simultaneously.

SUMMARY

This disclosure provides a communication method. Different resources are dynamically allocated to signals, so that a receiver functional module in a chip may fully utilize flexibility of a software baseband architecture, and different requirements of various signals can be further targetedly met.

According to a first aspect, a communication method is provided. The method includes: receiving a first signal; allocating a processing resource to the first signal based on parameter information of the first signal, where the processing resource includes a processing algorithm, and the processing algorithm includes an algorithm for channel estimation CE and/or multiple-input multiple-output MIMO detection; and performing CE and MIMO detection on the first signal based on the processing resource.

Different processing resources are allocated to the first signal based on the parameter information of the first signal, so that flexibility of a software baseband architecture can be fully utilized, and different requirements of various signals can be targetedly met.

With reference to the first aspect, in some implementations of the first aspect, the parameter information includes at least one of the following: a specification, a format, and a quantity of data symbols of the first signal, where the specification of the first signal includes at least one of the following: a bandwidth, an antenna quantity, a cell quantity, and a user quantity, and the format of the first signal includes a protocol version of the signal.

A plurality of factors including a signal specification, a format, a quantity of data symbols, a performance indicator, and the like are considered as determining bases for allocating the processing resource to the first signal, so that different requirements of various signals can be targetedly met.

It should be understood that the quantity of data symbols in embodiments of this disclosure may alternatively be represented by a data packet length.

With reference to the first aspect, in some implementations of the first aspect, the allocating a processing resource to the first signal based on parameter information of the first signal includes: if it is determined, based on the parameter information, that the first signal is a signal with a small antenna quantity and a narrow bandwidth, allocating a denoising CE processing algorithm and a denoising MIMO processing algorithm to the first signal.

Optionally, in embodiments of this disclosure, the signal with a small antenna quantity and a narrow bandwidth may be classified as a signal in a general-specification signal scenario. For example, a signal whose product of the antenna quantity and the bandwidth is less than 640 may be used as the signal in the general-specification signal scenario.

It should be understood that, in this disclosure, the product of the antenna quantity and the bandwidth being 640 is merely an example. In an actual disclosure, a threshold in the general-specification signal scenario may be determined based on an actual requirement.

Because the signal in the general-specification scenario does not have a particularly high requirement on a delay, when it is determined that the received signal is the signal in the general-specification scenario, a denoising processing algorithm may be used to meet a precision requirement and a delay constraint of a chip.

Optionally, the foregoing denoising processing algorithm may be a smoothing denoising algorithm. For details, refer to a conventional technology.

With reference to the first aspect, in some implementations of the first aspect, the allocating a processing resource to the first signal based on parameter information of the first signal includes: if it is determined, based on the parameter information, that the first signal is a signal with a large antenna quantity and/or a wide bandwidth and with a single data symbol, allocating a non-noising CE processing algorithm or a low-cost CE processing algorithm and a low-cost MIMO processing algorithm to the first signal; if it is determined, based on the parameter information, that the first signal is a signal with a large antenna quantity and/or a wide bandwidth and with a plurality of data symbols, allocating a denoising CE processing algorithm and a MIMO algorithm with general complexity to the first signal; if it is determined, based on the parameter information, that the first signal is a signal with a quantity of multiple users and a single data symbol, and that the first signal is a signal with a large antenna quantity and/or a wide bandwidth, allocating a low-cost CE processing algorithm and a low-cost MIMO processing algorithm to the first signal; or if it is determined, based on the parameter information, that the first signal is a signal from a dual cell, and that the first signal is a signal with a large antenna quantity and/or a wide bandwidth, allocating a first algorithm and a second algorithm to the first signal, where the first algorithm includes: a low-cost non-noising CE processing algorithm for the last symbol, and a denoising CE processing algorithm for other symbols; and the second algorithm is a low-cost MIMO processing algorithm.

Optionally, in embodiments of this disclosure, the signal with a large antenna quantity and/or a wide bandwidth may be classified as a signal in a high-specification signal scenario, and a signal whose product of the antenna quantity and the bandwidth is greater than or equal to 640 may be used as the signal in the high-specification signal scenario.

It should be understood that, in this disclosure, the product of the antenna quantity and the bandwidth being 640 is merely an example. In an actual disclosure, a threshold in the high-specification signal scenario may be determined based on an actual requirement.

Because the high-specification signal has relatively high requirements on precision and a delay, when it is determined that the received signal is the signal in the high-specification scenario, a low-cost processing algorithm is allocated to the high-specification signal, so that the requirement of the high-specification signal on a delay and precision can be met.

With reference to the first aspect, in some implementations of the first aspect, the allocating a processing resource to the first signal based on parameter information of the first signal includes: if it is determined, based on the parameter information, that the first signal is a signal that is with a long training field LTF symbol HE 2×-LTF using comb ½ in frequency domain and that needs to meet an extreme delay constraint, allocating a CE processing algorithm with 2× processing and a MIMO processing algorithm with 2× processing to the first signal; or if it is determined, based on the parameter information, that the first signal is a signal that is in a VHT format, that is from a dual cell, and that needs to meet an extreme delay constraint, allocating a low-cost CE processing algorithm and a low-cost MIMO processing algorithm to the first signal.

It should be understood that the HE-2×LTF is an LTF symbol using comb ½ in frequency domain, and a time length is ½ of that of a common LTF.

It is determined that the received signal is a signal that needs to meet an extreme delay constraint, and a corresponding low-cost processing algorithm is allocated to the signal, so that a requirement of the signal on a delay constraint in this scenario can be met.

With reference to the first aspect, in some implementations of the first aspect, the allocating a processing resource to the first signal based on parameter information of the first signal includes: if it is determined, based on the parameter information, that the first signal is a signal requiring high processing precision, allocating a denoising CE processing algorithm and a MIMO processing algorithm with high precision to the first signal.

It is determined that the received signal is a signal requiring high processing precision, and a corresponding processing algorithm with high precision is allocated to the signal, so that the requirement of the signal on high processing precision can be met.

With reference to the first aspect, in some implementations of the first aspect, the allocating a processing resource to the first signal based on parameter information of the first signal includes: if it is determined, based on the parameter information, that the first signal is a signal requiring a high sensitivity, allocating a denoising CE processing algorithm and a channel tracking algorithm to the first signal.

With reference to the first aspect, in some implementations of the first aspect, the allocating a processing resource to the first signal based on parameter information of the first signal includes: if it is determined, based on the parameter information, that the first signal is a signal requiring low power consumption, and when the first signal is with a single symbol, allocating a low-cost CE processing algorithm and a low-cost MIMO processing algorithm to the first signal, or when the first signal is with a plurality of symbols, allocating a CE processing algorithm with general complexity and a MIMO processing algorithm with general complexity to the first signal.

With reference to the first aspect, in some implementations of the first aspect, the processing resource further includes a processing unit, and the allocating a processing resource to the first signal based on parameter information of the first signal includes: allocating the processing unit to the first signal based on the bandwidth and the antenna quantity that are in the parameter information of the first signal.

Optionally, a quantity of processing units allocated to the first signal may be obtained by dividing the bandwidth of the first signal by the antenna quantity that is in the parameter information. The signal is allocated to different processing units for parallel processing, so that a processing delay of each processing unit can be reduced.

According to a second aspect, a communication apparatus is provided. The apparatus includes: a receiving module, configured to receive a first signal; and a processing module, configured to allocate a processing resource to the first signal based on parameter information of the first signal, where the processing resource includes a processing algorithm, and the processing algorithm includes an algorithm for channel estimation CE and/or multiple-input multiple-output MIMO detection. The processing module is further configured to perform CE and MIMO detection on the first signal based on the processing resource.

With reference to the second aspect, in some implementations of the second aspect, the parameter information includes at least one of the following: a specification, a format, and a quantity of data symbols of the first signal, where the specification of the first signal includes at least one of the following: a bandwidth, an antenna quantity, a cell quantity, and a user quantity, and the format of the first signal includes a protocol version of the signal.

With reference to the second aspect, in some implementations of the second aspect, the processing module is specifically configured to: if it is determined, based on the parameter information, that the first signal is a signal with a small antenna quantity and/or a narrow bandwidth, allocate a denoising CE processing algorithm and a denoising MIMO processing algorithm to the first signal.

With reference to the second aspect, in some implementations of the second aspect, the processing module is specifically configured to: if it is determined, based on the parameter information, that the first signal is a signal with a large antenna quantity and/or a wide bandwidth and with a single data symbol, allocate a non-noising CE processing algorithm or a low-cost CE processing algorithm, and a low-cost MIMO processing algorithm to the first signal; if it is determined, based on the parameter information, that the first signal is a signal with a large antenna quantity and/or a wide bandwidth and with a plurality of data symbols, allocate a denoising CE processing algorithm and a MIMO algorithm with general complexity to the first signal; if it is determined, based on the parameter information, that the first signal is a signal with a quantity of multiple users and a single data symbol, and that the first signal is a signal with a large antenna quantity and/or a wide bandwidth, allocate a low-cost CE processing algorithm and a low-cost MIMO processing algorithm to the first signal; or if it is determined, based on the parameter information, that the first signal is a signal from a dual cell, and that the first signal is a signal with a large antenna quantity and/or a wide bandwidth, allocate a first algorithm and a second algorithm to the first signal, where the first algorithm includes: a low-cost non-noising CE processing algorithm for the last symbol, and a denoising CE processing algorithm for other symbols; and the second algorithm is a low-cost MIMO processing algorithm.

With reference to the second aspect, in some implementations of the second aspect, the processing module is specifically configured to: if it is determined, based on the parameter information, that the first signal is a signal that is with a long training field LTF symbol HE 2×-LTF using comb ½ in frequency domain and that needs to meet an extreme delay constraint, allocate a CE processing algorithm with 2× processing and a MIMO processing algorithm with 2× processing to the first signal; or if it is determined, based on the parameter information, that the first signal is a signal that is in a VHT format, that is from a dual cell, and that needs to meet an extreme delay constraint, allocate a low-cost CE processing algorithm and a low-cost MIMO processing algorithm to the first signal.

With reference to the second aspect, in some implementations of the second aspect, if it is determined, based on the parameter information, that the first signal is a signal requiring high processing precision, a denoising CE processing algorithm and a MIMO processing algorithm with high precision are allocated to the first signal.

With reference to the second aspect, in some implementations of the second aspect, if it is determined, based on the parameter information, that the first signal is a signal requiring a high sensitivity, a denoising CE processing algorithm and a channel tracking algorithm are allocated to the first signal.

With reference to the second aspect, in some implementations of the second aspect, if it is determined, based on the parameter information, that the first signal is a signal requiring low power consumption, and when the first signal is with a single symbol, a low-cost CE processing algorithm and a low-cost MIMO processing algorithm are allocated to the first signal, or when the first signal is with a plurality of symbols, a CE processing algorithm with general complexity and a MIMO processing algorithm are allocated to the first signal.

With reference to the second aspect, in some implementations of the second aspect, the processing resource further includes a processing unit, and the processing module is further configured to: allocate the processing unit to the first signal based on the bandwidth and the antenna quantity that are in the parameter information of the first signal.

According to a third aspect, a communication apparatus is provided. The communication apparatus has a function of implementing the methods according to the foregoing aspects. The function may be implemented by hardware, or may be implemented by hardware executing corresponding software. The hardware or the software includes one or more modules corresponding to the function.

According to a fourth aspect, a communication apparatus is provided, and includes a processor. The processor is configured to be coupled to a memory, and is configured to invoke a computer program from the memory and run the computer program, to perform the method according to any one of the foregoing aspects or the possible implementations of the foregoing aspects.

According to a fifth aspect, a communication apparatus is provided, and includes a processor and a memory. The memory is configured to store a computer program, and the processor is configured to invoke the computer program from the memory and run the computer program, so that the communication device performs the method according to any one of the foregoing aspects or the possible implementations of the foregoing aspects.

According to a sixth aspect, an apparatus (where for example, the apparatus may be a chip system) is provided, and the apparatus includes a processor configured to support the communication apparatus in implementing functions in the foregoing aspects. In a possible design, the apparatus further includes a memory, and the memory is configured to store program instructions and data required by the communication apparatus. When the apparatus is a chip system, the apparatus may include a chip, or may include a chip and another discrete component.

According to a seventh aspect, a computer-readable storage medium is provided, and is configured to store a computer program. The computer program includes instructions for performing the method according to any one of the foregoing aspects or the possible implementations of the foregoing aspects.

According to an eighth aspect, a computer program product is provided, and includes a computer program. When the computer program is run on a computer device, the computer device is enabled to perform the methods according to the foregoing aspects.

These or other aspects of this disclosure are more concise and easier to understand in descriptions of the following embodiments.

DESCRIPTION OF EMBODIMENTS

The following describes technical solutions of this disclosure with reference to accompanying drawings.

Figure 1:
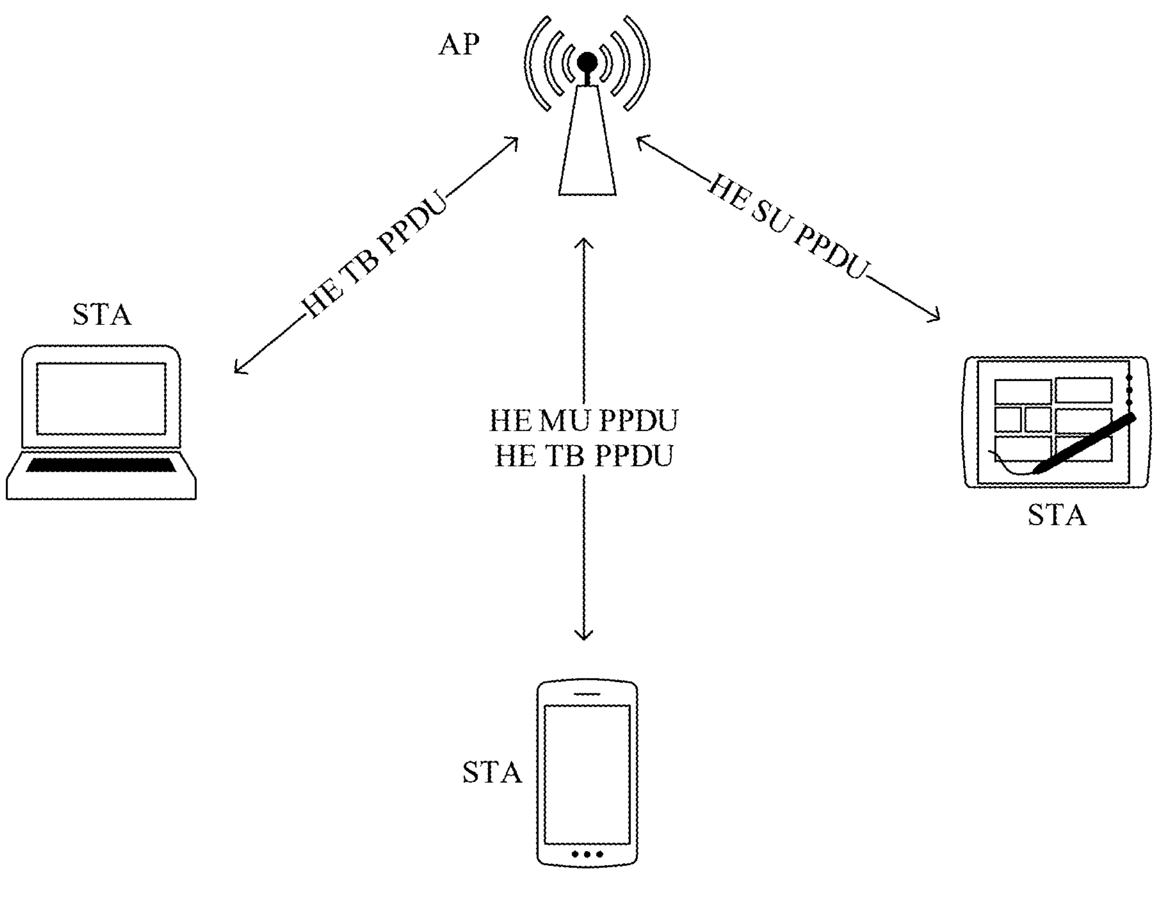
FIG. 1 is a schematic diagram of a typical WLAN networking scenario.

In a typical WLAN networking scenario, an AP is associated with a plurality of STAs. The AP and the STA perform wireless communication through a mechanism defined in the 802.11 series protocols. Data information from a medium access control (MAC) layer is modulated by the AP or the STA into an OFDM signal for sending and receiving at an air interface. Different protocol frames include different fields (to be specific, with differences in parameters of an OFDM symbol such as a framing sequence, a time domain length, and a bandwidth). FIG. 1 is a schematic diagram of a typical WLAN networking scenario.

Figure 2:
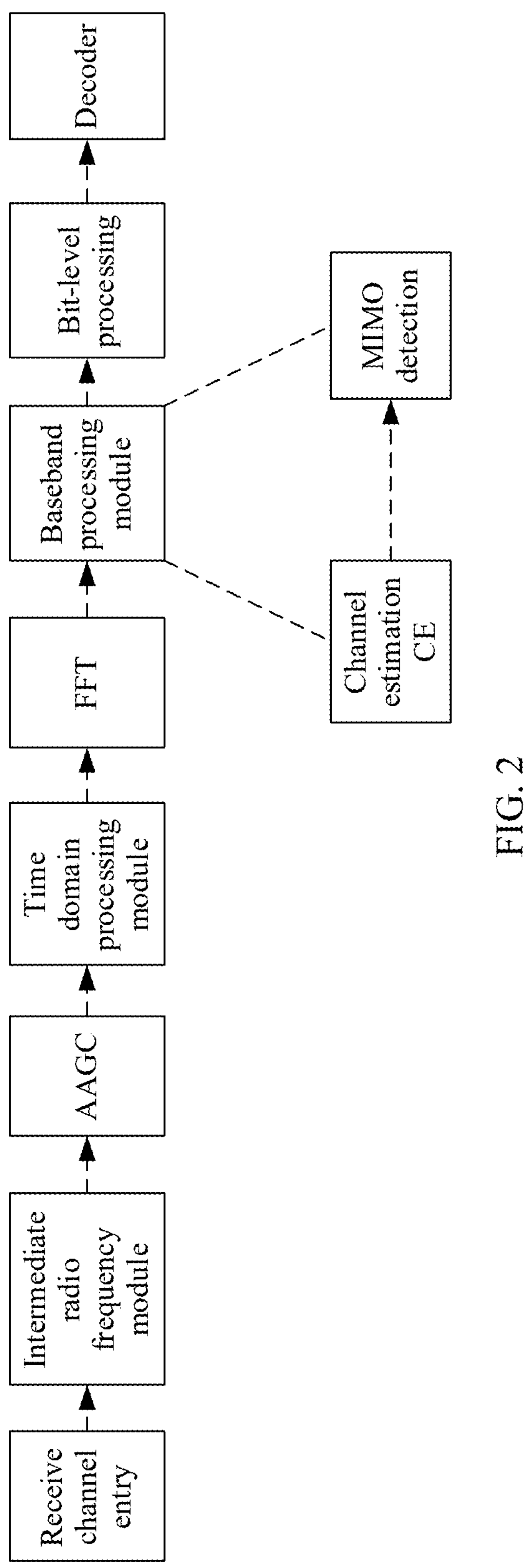
FIG. 2 is a schematic structural diagram of a receiver of a WLAN chip.

Sending and receiving of the foregoing signal may be implemented by a receiver functional module of a WLAN chip on an AP side or a STA side. FIG. 2 is a schematic structural diagram of a receiver of a WLAN chip. As shown in FIG. 2, a received signal enters a receive channel entry, passes through an intermediate radio frequency module to perform frequency conversion and an analog adaptive gain control (AAGC), and arrives at a time domain processing module. After completing signal synchronization and physical protocol data unit (PPDU) packet detection, the time domain processing module performs extraction on a time domain signal based on a time length of an OFDM symbol to obtain each OFDM symbol, and performs fast Fourier transform (FFT) to transform each OFDM symbol into a frequency domain baseband signal. A baseband processing part of the WLAN chip may adopt a software architecture, divide an entire frequency domain and a multi-antenna signal for different soft core processing units, namely, elastic processing units (elastic process units), to perform channel estimation (CE) and multiple-input multiple-output (MIMO) detection (MIMO detection). Through MIMO detection, bit-level estimation information is output. After processing such as bit-level de-interleaving, the information is sent to a decoder for decoding, and then source information of a signal transmitter is parsed out.

A baseband processing module in the receiver adopts the following algorithms to perform CE and MIMO detection.

(1) Smoothing Denoising Algorithm

Filtering processing is performed on a frequency domain signal x(k) obtained by performing FFT transform on an X-LTF symbol, and then a denoised channel estimation y(k) is obtained:

$$y(k) = \sum_{m=-L}^{L} (c(m) * x(k+m))$$

c(m) is a smoothing filtering coefficient, a filtering order is 2L+1, x is an input frequency domain signal, k is a subcarrier index of the signal, m is a tap index of the filtering coefficient, and L is a filter length. Based on correlation of signals in frequency domain and random characteristics of noise in frequency domain, by finely designing the filtering coefficient and the filtering order, the noise in x(k) may be effectively suppressed and detection performance can be improved. A higher filtering order indicates a greater software processing delay, but a better denoising effect. If a low-cost denoising algorithm is used, the filtering order is very low. To further reduce the delay and even achieve a non-noising effect, L=0 and c(0)=1.

(2) Low-Cost CE Algorithm and MIMO Algorithm

Low-cost (Low-cost) CE and MIMO are implemented as follows: A carrier granularity of frequency domain channel estimation and a granularity of a MIMO filtering coefficient are reduced. An example is CE using a ½ sampling granularity in frequency domain. MIMO filtering coefficients are calculated based on channel estimation values at an interval of one carrier, and interpolation is performed on the calculated MIMO filtering coefficients to obtain MIMO filtering coefficients in entire frequency domain. The MIMO detection is then performed.

Because CE and MIMO filtering coefficient calculation are performed on only a part of subcarriers, a quantity of operations of complex convolution, matrix inversion, and the like, decreases greatly, and an objective of reducing a delay can be achieved. In addition, in a matrix calculation process of calculating the MIMO filtering coefficients based on the channel estimation values output through CE, higher numerical precision indicates better calculation precision and better signal detection performance. However, high precision may also prolong a processing delay. Therefore, the numerical precision in MIMO coefficient calculation may be flexibly selected to balance impact on performance and a delay.

(3) Channel Tracking Algorithm

Figure 3:
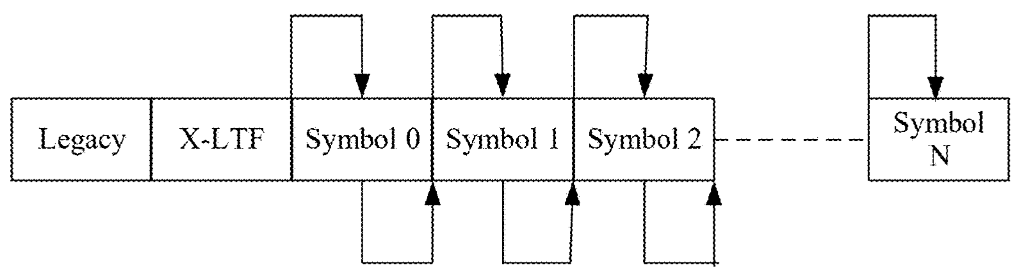
FIG. 3 is a schematic diagram of a channel tracking algorithm.

If a software delay margin is relatively large, for example, for a long PPDU with a low signal specification, an estimated signal after MIMO detection may even be determined as a constellation point and then compensated to a received signal of a data symbol, to reconstruct channel estimation $$H_1 = R_0 * \frac{s_0^*}{|s_0|},$$

where $H_1$ is a channel estimation value, $R_0$ is a frequency domain received signal of a data symbol, $S_0$ is a reconstructed data signal, and $S_0$* is a conjugate signal of the reconstructed data signal. MIMO detection of subsequent symbols is performed by constantly tracking a channel change and based on new channel estimation values. This algorithm is complex to implement and has a high requirement on a software delay. FIG. 3 is a schematic diagram of a channel tracking algorithm.

Wi-Fi protocols have evolved into a plurality of IEEE 802.11 series protocol versions. To support access of existing terminals in forward compatibility, mainstream product functions of Wi-Fi vendors need to support framing, deframing, sending, and receiving of data packets of a plurality of protocol versions, and this poses a great challenge to a chip function.

In addition, an immediate response scenario defined by the Wi-Fi protocol poses a further challenge to a processing delay of a chip. An extreme delay constraint only has minimum inter-frame space (SIFS) time of 16 us for a process of receiving a data packet, reporting the data packet after baseband processing, performing MAC processing on the data packet, generating a response packet, and sending the response packet.

Higher requirements of a function scope on multi-protocol version compatibility and a chip processing delay, processing specifications (a bandwidth, an antenna Tx, a user, a cell, and a quantity of streams) of a chip supported by mainstream commercial services, chip power consumption, and a chip cost constraint (AP dense networking) lead to a relatively high technical barrier in a Wi-Fi chip architecture design. Currently, it is difficult for a common chip structure to meet the foregoing requirements simultaneously.

This disclosure provides a communication method. In this method, resources of signals are dynamically allocated and processed, so that a receiver functional module in a chip may fully utilize flexibility of a software baseband architecture, and different requirements of different signals can be targetedly met.

Figure 4:
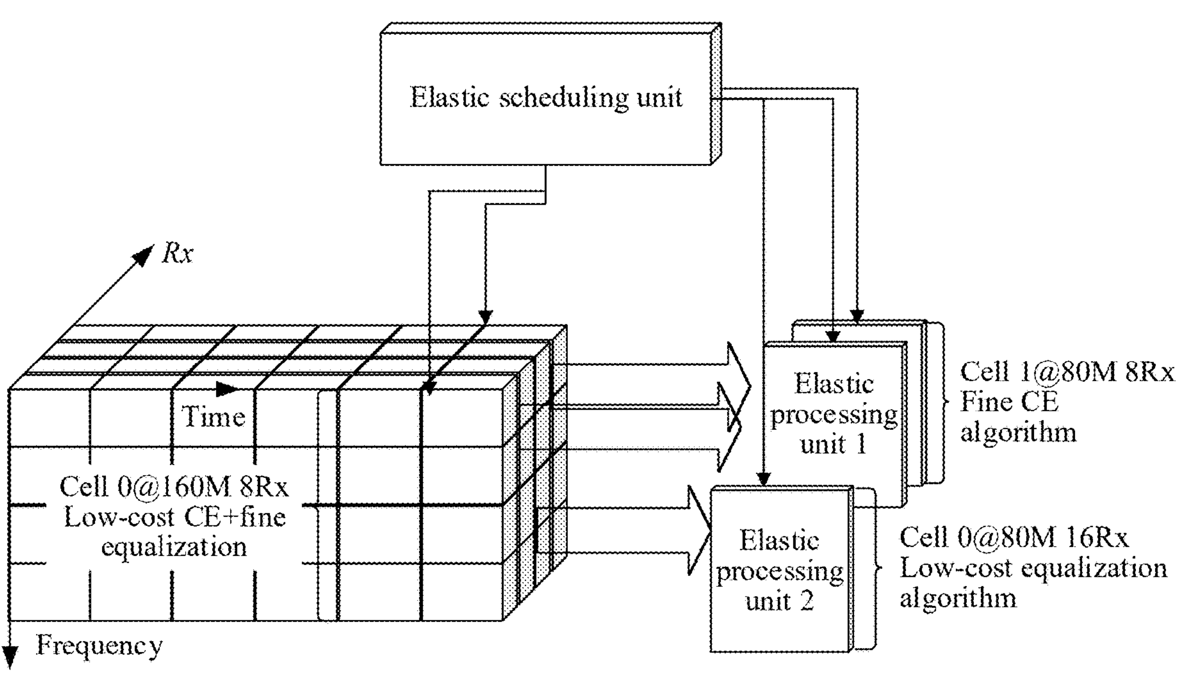
FIG. 4 is a schematic structural diagram of allocating a processing resource to a received signal according to an embodiment of this disclosure.

FIG. 4 is a schematic structural diagram of allocating a processing resource to a received signal according to an embodiment of this disclosure. FIG. 4 includes an elastic scheduling unit (elastic scheduling unit) and an elastic processing unit (elastic processing unit). For received signals in different formats, a receiver may allocate different processing algorithms to signals via an elastic software receiver architecture, to meet different requirements of various signals.

For example, different processing units may be allocated to the received signals based on different service requirements and one or more factors of a bandwidth, an antenna quantity, a quantity of data symbols (a data packet length or a signal length), a PPDU format, and the like. In addition, processing of the received signal is performed according to differentiated algorithms (for example, demodulation of physical protocol data units (PPDUs) in different formats, fine/low-cost channel estimation (low-cost CE), and fine/low-cost MIMO weights calculation (low-cost MIMO weights calculation)), to complete signal detection.

It should be understood that the elastic scheduling unit and the elastic processing unit in this embodiment of this disclosure may alternatively be replaced by other names. This is not limited in this embodiment of this disclosure.

Figure 5:
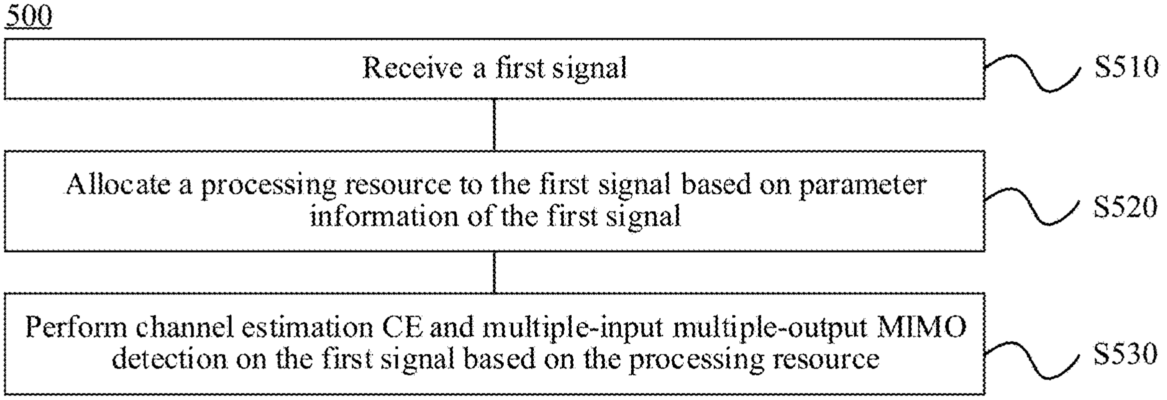
FIG. 5 is a schematic diagram of a communication method according to an embodiment of this disclosure.

FIG. 5 is a schematic diagram of a communication method according to an embodiment of this disclosure. As shown in FIG. 5, a method 500 includes steps S510 to S530. The following describes these steps in detail.

S510: Receive a first signal.

In an embodiment, the first signal may be a signal received by an access point AP (for example, a base station) or a station STA (for example, a terminal device) from another access point or station.

It should be understood that the access point AP in this embodiment of this disclosure may be a wireless router. The access point AP may send a non HT/HT/VHT/HE SU signal and a VHT/HE MU PPDU signal defined in the Wi-Fi protocol, and the access point AP may receive a non HT/HT/VHT/HE SU signal and an HE TB PPDU signal defined in the Wi-Fi protocol.

The station STA in this embodiment of this disclosure may be various Wi-Fi terminal devices. The station STA may send a non-HT/HT/VHT/HE SU signal and an HE TB PPDU signal defined in a Wi-Fi protocol, and the station STA may receive a non HT/HT/VHT/HE SU signal and a VHT/HE MU PPDU signal defined in the Wi-Fi protocol (where HT is short for high throughput: IEEE 802.11n protocol frame; VHT is short for very high throughput: IEEE 802.11ac protocol frame; HE is short for high efficiency: IEEE 802.11ax protocol frame; SU is single user; MU is multiple user multiple user; and TB is transport block transport block).

S520: Allocate a processing resource to the first signal based on parameter information of the first signal.

In an embodiment, the processing resource includes a processing algorithm, and the processing algorithm includes an algorithm for channel estimation CE and/or multiple-input multiple-output MIMO detection.

In an embodiment, the parameter information includes at least one of the following: a specification, a format, a quantity of data symbols, and a performance indicator of the first signal, where the specification of the first signal includes at least one of the following: a bandwidth, an antenna quantity, a cell quantity, and a user quantity, and the format of the first signal includes a protocol version of the signal.

Optionally, the format of the first signal may be different protocol versions, for example, a/n/ac/ax/b.

Optionally, the specification of the first signal may further include a quantity of signal streams, namely, spatial streams.

It should be understood that a receiver may determine the first signal based on the parameter information of the first signal, for example, determine a bandwidth size, an antenna quantity, a user quantity, a cell quantity, a signal format, and a quantity of data symbols of the first signal, further determine a requirement of the first signal, for example, a requirement on a delay, processing precision, a sensitivity, and power consumption, and allocate the corresponding processing resource to the first signal, so that different requirements of different signals can be met.

Optionally, the performance indicator of the first signal may further include a precision requirement, a delay requirement, and the like. This is not limited in embodiments of this disclosure.

The first signal may correspond to different scenario requirements based on the parameter information of the first signal, and a corresponding processing resource may be allocated to the signal based on the different scenario requirements of the signal, to adapt to different signals in the different scenario requirements, so that signal processing can be more accurate.

Specifically, in an embodiment, the allocating a processing resource to the first signal based on parameter information of the first signal includes: if it is determined, based on the parameter information, that the first signal is a signal with a small antenna quantity and a narrow bandwidth, allocating a denoising CE processing algorithm and a denoising MIMO processing algorithm to the first signal.

It should be understood that in this embodiment of this disclosure, the corresponding processing resource is allocated to the first signal based on the parameter information of the first signal, where first signals may be classified into different levels in specification, for example, a high-specification signal and a general-specification signal. For example, the general-specification signal may be a signal with a small antenna quantity and a narrow bandwidth, for example, a signal whose product of the antenna quantity and the bandwidth is less than 640. Optionally, the general-specification signal may be a signal whose antenna quantity is less than or equal to 4 and whose bandwidth is less than or equal to 80M. The high-specification signal may be a signal with a large antenna quantity and/or a wide bandwidth, for example, a signal whose product of the antenna quantity and the bandwidth is greater than or equal to 640. Optionally, the high-specification signal may be a signal whose antenna quantity is greater than or equal to 4 and whose bandwidth is greater than or equal to 160M, or may be a signal whose bandwidth is greater than or equal to 80M and whose antenna quantity is greater than or equal to 8. It should be understood that, in this disclosure, the "640" for performing classification on the specifications of the first signal is merely an example. In an actual situation, a user quantity and a cell quantity may further need to be considered. During specific disclosure, the threshold may be limited based on an actual situation, and this is not limited in this embodiment of this disclosure.

It should be understood that, the signal with a small antenna quantity and a narrow bandwidth in this embodiment of this disclosure may alternatively be represented as a signal in a general-specification scenario or a general-specification signal, and the signal with a large antenna quantity and/or a wide bandwidth may alternatively be represented as a high-specification signal or a signal in a high-specification scenario.

It should be understood that, which format of a signal may be general-specification or high-specification is not limited in this disclosure. A specific situation may be limited based on a specific requirement of a person skilled in the art. For example, the high-specification signal in this embodiment of this disclosure may be a signal with a wide bandwidth and a large antenna quantity (more than 4Rx, in other words, more than 4 antennas, where Rx represents receiving antenna). The general-specification signal can be a signal with a narrow bandwidth and a small antenna quantity (4Rx or less).

Because the signal in the general specification scenario (with a small antenna quantity and a narrow bandwidth) does not have a particularly high requirement on a delay, when it is determined that the received signal is a signal in a general specification scenario (with a small antenna quantity and a narrow bandwidth), a denoising processing algorithm may be used to meet a precision requirement and a delay constraint of a chip.

In another embodiment, the allocating a processing resource to the first signal based on parameter information of the first signal includes: if it is determined, based on the parameter information, that the first signal is a signal with a large antenna quantity and/or a wide bandwidth and with a single data symbol, allocating a non-noising CE processing algorithm or a low-cost CE processing algorithm, and a low-cost MIMO processing algorithm to the first signal; if it is determined, based on the parameter information, that the first signal is a signal with a large antenna quantity and/or a wide bandwidth and with a plurality of data symbols, allocating a denoising CE processing algorithm and a MIMO algorithm with general complexity to the first signal; if it is determined, based on the parameter information, that the first signal is a signal with a quantity of multiple users and a single data symbol, and that the first signal is a signal with a large antenna quantity and/or a wide bandwidth, allocating a low-cost CE processing algorithm and a low-cost MIMO processing algorithm to the first signal; or if it is determined, based on the parameter information, that the first signal is a signal from a dual cell, allocating a first algorithm and a second algorithm to the first signal, where the first algorithm includes: a low-cost non-noising CE processing algorithm for the last symbol, and a denoising CE processing algorithm for other symbols; and the second algorithm is a low-cost MIMO processing algorithm.

Because the high-specification signal (a signal with a large antenna quantity and/or a wide bandwidth) has a relatively high requirement on precision and a delay, when it is determined that the received signal is a signal in a high-specification scenario (a signal with a large antenna quantity and/or a wide bandwidth), a low-cost processing algorithm is allocated to the high-specification signal (a signal with a large antenna quantity and/or a wide bandwidth), so that the requirement of the high-specification signal on a delay and precision can be met.

In another embodiment, the allocating a processing resource to the first signal based on parameter information of the first signal includes: if it is determined, based on the parameter information, that the first signal is a signal that is with a long training field LTF symbol (HE 2×-long training field, HE 2×-LTF) using comb ½ in frequency domain and that needs to meet an extreme delay constraint, allocating a CE processing algorithm with 2× processing and a MIMO processing algorithm with 2× processing to the first signal; or if it is determined, based on the parameter information, that the first signal is a signal that is in a VHT format, that is from a dual cell, and that needs to meet an extreme delay constraint, allocating a low-cost CE processing algorithm and a low-cost MIMO processing algorithm to the first signal.

It is determined that the received signal is a signal that needs to meet an extreme delay constraint, and a corresponding low-cost processing algorithm is allocated to the signal, so that a requirement of the signal on a delay constraint in this scenario can be met.

In another embodiment, the allocating a processing resource to the first signal based on parameter information of the first signal includes: if it is determined, based on the parameter information, that the first signal is a signal requiring high processing precision, allocating a denoising CE processing algorithm and a MIMO processing algorithm with high precision to the first signal.

It is determined that the received signal is a signal requiring high processing precision, and a corresponding processing algorithm with high precision is allocated to the signal, so that a requirement of the signal on high processing precision can be met.

In another embodiment, the allocating a processing resource to the first signal based on parameter information of the first signal includes: if it is determined, based on the parameter information, that the first signal is a signal requiring a high sensitivity, allocating a denoising CE processing algorithm and a channel tracking algorithm to the first signal.

In another embodiment, the allocating a processing resource to the first signal based on parameter information of the first signal includes: if it is determined, based on the parameter information, that the first signal is a signal requiring low power consumption, and when the first signal is with a single symbol, allocating a low-cost CE processing algorithm and a low-cost MIMO processing algorithm to the first signal, or when the first signal is with a plurality of symbols, allocating a CE processing algorithm with general complexity and a MIMO processing algorithm with general complexity to the first signal.

When it is determined that the received signal is a signal in a requirement scenario of low processing power consumption, a low-cost or a general processing algorithm is allocated to the signal, so that a requirement of a device on low power consumption can be met.

In an embodiment, the allocating a processing resource to the first signal based on parameter information of the first signal includes: allocating a processing unit to the first signal based on the bandwidth and the antenna quantity that are in the parameter information of the first signal.

Optionally, a quantity of processing units allocated to the first signal may be obtained by dividing the bandwidth of the first signal by the antenna quantity carried in the parameter information. The signal is allocated to different processing units for processing, so that a processing delay of each processing unit can be reduced.

S530: Perform channel estimation CE and multiple-input multiple-output MIMO detection on the first signal based on the processing resource.

The first signal is processed based on the different processing resources allocated to the signal in the foregoing steps, to meet different requirements of different signals on items including a delay, a sensitivity, a service volume specification, and the like.

In an embodiment, after the first signal is processed, bit-level processing such as de-interleaving may be further performed on a processed first signal, and then the signal enters a decoder for decoding to parse out source information of a signal transmitting end.

In this embodiment of this disclosure, a corresponding processing resource is allocated to the first signal based on the parameter information of the first signal, so that flexibility of a software baseband architecture can be fully utilized, and different requirements of various signals can be targetedly met. In addition, a division granularity can be further reduced, processing precision of an algorithm can be improved, and performance requirements in different scenarios can be met.

When a receiver module in this embodiment of this disclosure processes a received signal, there is no difference between a legacy (legacy)-STF field and a high efficiency-short training field (HE-STF), and a difference mainly lies in an HE long training field (HE-LTF) and a subsequent data field. First, CE is performed based on an HE-LTF field in the received signal, and after CE is completed, a coefficient for performing MIMO filtering (MIMO filt) on each subsequent data symbol is calculated on the first data symbol.

Figure 6:
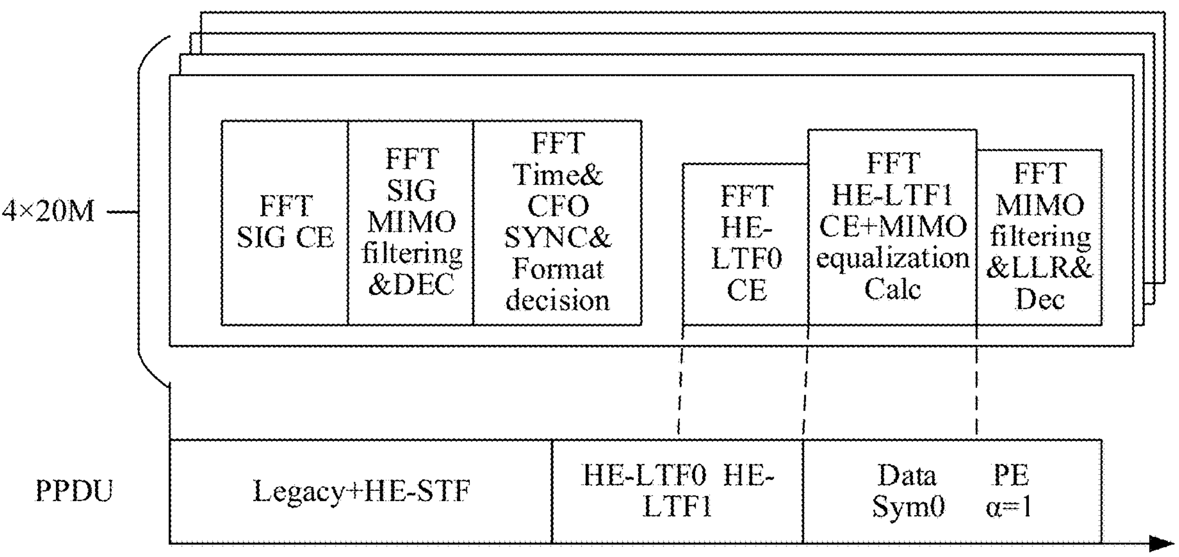
FIG. 6 is a schematic diagram of processing a received signal by a baseband processing module according to an embodiment of this disclosure.

FIG. 6 is a schematic diagram of processing a received signal by a baseband processing module according to an embodiment of this disclosure.

In this embodiment of this disclosure, after receiving the signal, a receiver determines, based on parameter information of the received signal, for example, a specification, a format, and a quantity of data symbols of the received signal, that the current received signal is a general-specification signal (with a small antenna quantity and a narrow bandwidth), for example, an HE PPDU signal that is from a single cell and that is modulated with a 4R2SS 80M bandwidth (where R represents receiving antenna, or may be represented by Rx (receiving antenna), and SS is spatial stream (spatial stream)). The baseband processing module in the receiver may allocate a processing algorithm to the received signal, and perform channel estimation and MIMO detection on the received signal according to the algorithm. In this embodiment of this disclosure, the baseband processing module may allocate a smoothing denoising CE processing algorithm and a smoothing denoising MIMO algorithm to the general-specification received signal (with a small antenna quantity and a narrow bandwidth) to meet a delay constraint requirement of a chip.

As shown in FIG. 6, the received signal is processed in the baseband processing module of a receiver functional module. It should be understood that each PPDU in the received signal may include different fields. First, parameter information of the received signal is obtained by processing a legacy-STF field and an HE-STF field, where the parameter information of the received signal may include: a specification, format, performance requirement, and the like of the signal (where the signal format may include different protocol versions; the signal specification may include a bandwidth, an antenna quantity, a user quantity, and the like; and the performance requirement may include a sensitivity requirement, a precision requirement, and the like). Processing on the legacy-STF field and the HE-STF field includes: SIG field channel estimation (SIG CE), SIG field MIMO filtering (SIG MIMO FILT), and filtered signal decoding (decoding) (SIG DEC). TIME&CFO SYNC (carrier frequency offset synchronization, carrier frequency offset synchronization) further completes time offset and frequency offset estimation, and MODE DETECT completes PPDU format decision. Processing on the legacy-STF field and the HE-STF field is the same as that in a conventional technology. For a specific process, refer to the conventional technology. Details are not described herein in this embodiment of this disclosure.

Based on the parameter information that is of the received signal and that is obtained by processing the legacy-STF field and the HE-STF field, it is determined that the current received signal is a general-specification signal (with a small antenna quantity and a narrow bandwidth), and a processing algorithm described below may be allocated to the general-specification signal.

For an HE-LTF field and an HE-data field with the tightest delay, a frequency domain smoothing denoising CE processing algorithm and a frequency domain smoothing denoising MIMO algorithm are adopted. Specifically, after receiving each HE-LTF symbol, the receiver performs channel estimation on a frequency domain baseband signal obtained through FFT transform, and the channel estimation algorithm is in a smoothing denoising manner. An obtained channel estimation result is for calculating MIMO equalization weights of subsequent data symbols. After a data symbol (data sym0) is received, MIMO filtering is performed on the data symbol, and a filtering coefficient is the MIMO weight obtained through calculation based on the channel estimation value. MIMO filtering of each data symbol outputs a log likelihood ratio (LLR) value to hardware for bit-level de-interleaving and decoding.

Before processing the received signal, the baseband processing module may further allocate a processing unit to the received signal based on a specification, a format, and the like of the received signal. Optionally, the baseband processing module may allocate a processing soft core for the received signal. A quantity of soft cores to be allocated may be determined based on a signal bandwidth and an antenna quantity. For example, the quantity of soft cores=total bandwidth/dividing bandwidth. Generally, the quantity of soft cores may be equal to the antenna quantity.

In this embodiment of this disclosure, because the received signal is a general-specification signal (with a small antenna quantity and a narrow bandwidth), for example, the HE PPDU signal that is from the single cell and that is modulated with the 4R2SS 80M bandwidth, the received signal may be allocated to four soft cores (where it should be understood that the software core herein may be considered as the processing unit described above, and this is not limited in this disclosure) for parallel processing, and each soft core processes a 20M 4Rx received signal to reduce a processing delay of each soft core.

In this embodiment of this disclosure, the receiver determines, based on the parameter information of the received signal, that the received signal is a signal in a general-specification scenario (with a small antenna quantity and a narrow bandwidth), and then allocates a corresponding processing algorithm and/or a processing unit to the received signal, so that the receiver may meet a requirement in the general-specification signal scenario.

Figure 7:
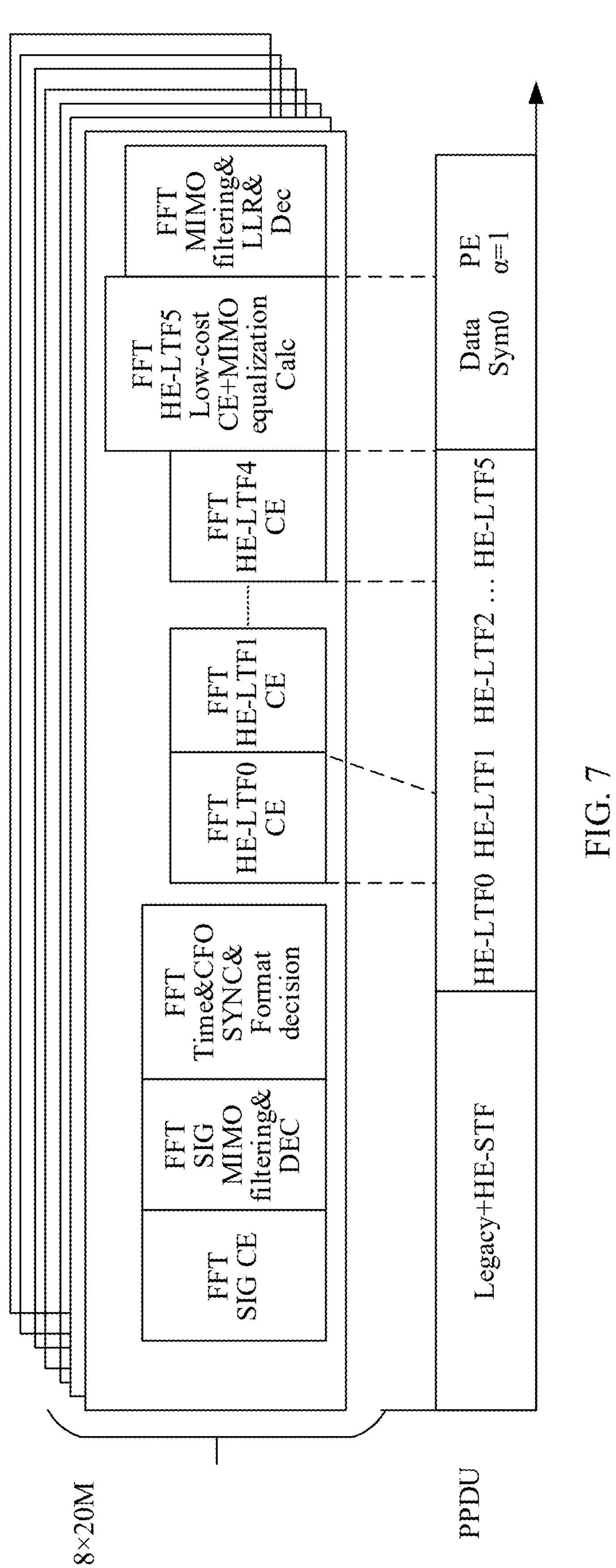
FIG. 7 is a schematic diagram of processing a received signal by another baseband processing module according to an embodiment of this disclosure.

FIG. 7 is a schematic diagram of processing a received signal by another baseband processing module according to an embodiment of this disclosure. Similar to an embodiment of this disclosure in FIG. 6, in this embodiment of this disclosure, after the signal is received, it is determined, based on parameter information of the received signal, for example, a specification, a format, and a quantity of data symbols that are of the received signal, that the current received signal is a high-specification signal (with a large antenna quantity and/or a wide bandwidth) and a short data packet signal (with a single data symbol), for example, an HE single data symbol PPDU signal modulated with an 8R6SS 160M bandwidth. In this case, the baseband processing module in a receiver may allocate a processing algorithm to the received signal, and perform channel estimation and MIMO detection on the received signal according to the algorithm. In this embodiment of this disclosure, the baseband processing module may use a non-noising CE algorithm or a low-cost CE (low-cost CE) algorithm for the last HE-LTF symbol and use a low-cost MIMO algorithm for the first data symbol.

As shown in FIG. 7, the received signal is processed in the baseband processing module of a receiver functional module. First, the parameter information of the received signal is obtained by processing a legacy-STF field and an HE-STF field. Processing on the legacy-STF field and the HE-STF field is the same as that in a conventional technology. Details are not described herein in this embodiment of this disclosure.

Based on the parameter information that is of the received signal and that is obtained by processing the legacy-STF field and the HE-STF field, it is determined that the current received signal is a high-specification signal and a short data packet signal, and a processing algorithm described below may be allocated to the signal.

For an HE-LTF and an HE-data field with the tightest delay, a non-noising CE algorithm or a low-cost CE (low-cost CE) algorithm is used on the last HE-LTF symbol, and a low-cost MIMO algorithm is used on the first data symbol. Specifically, during reception of HE-LTF0 to HE-LTF4, each time an HE-LTF symbol is received, denoising channel estimation processing is performed on a frequency domain signal of the symbol. In a channel estimation process, the low-cost CE algorithm is adopted, to be specific, a channel estimation value is calculated at an interval of several subcarriers. After HE-LTF5 is received, non-noising estimation is performed on a signal of the LTF symbol for calculation, and a channel estimation value is also calculated at an interval of several subcarriers. Then, MIMO filtering weights of subsequent data symbols are calculated based on channel estimation values of several HE-LTF symbols, and linear interpolation is performed on the MIMO weights in frequency domain to obtain a MIMO weight corresponding to each subcarrier. After a data symbol 0 is received, MIMO filtering is performed on the data symbol, and a filtering coefficient is the MIMO weight obtained through calculation based on the channel estimation value and through linear interpolation. MIMO filtering of the data symbol 0 outputs an LLR value to hardware for bit-level de-interleaving and decoding.

Similarly, before allocating a processing algorithm, the receiver may further allocate a processing unit, such as a soft core, to the received signal. In this embodiment of this disclosure, because the received signal is a high-specification signal (a signal with a large antenna quantity and/or a wide bandwidth) and a short data packet signal (with a single data symbol), for example, the HE single data symbol PPDU signal modulated with the 8R6SS 160M bandwidth, the receiver may allocate the received signal to eight soft cores for parallel processing, and each soft core processes a 20M 8Rx received signal to reduce a processing delay of each soft core.

Optionally, the low-cost CE and MIMO processing algorithm may be implemented by reducing density of channel estimation and weight calculation on a physical resource, or reducing data processing calculation precision. For the foregoing method, refer to the conventional technology. Details are not described herein in this embodiment of this disclosure.

In this embodiment of this disclosure, the receiver may determine, based on the parameter information of the received signal, that the received signal is a high-specification signal, and then allocate a corresponding processing algorithm and/or a processing unit to the received signal, so that the receiver may meet a requirement in the high-specification signal scenario.

Figure 8:
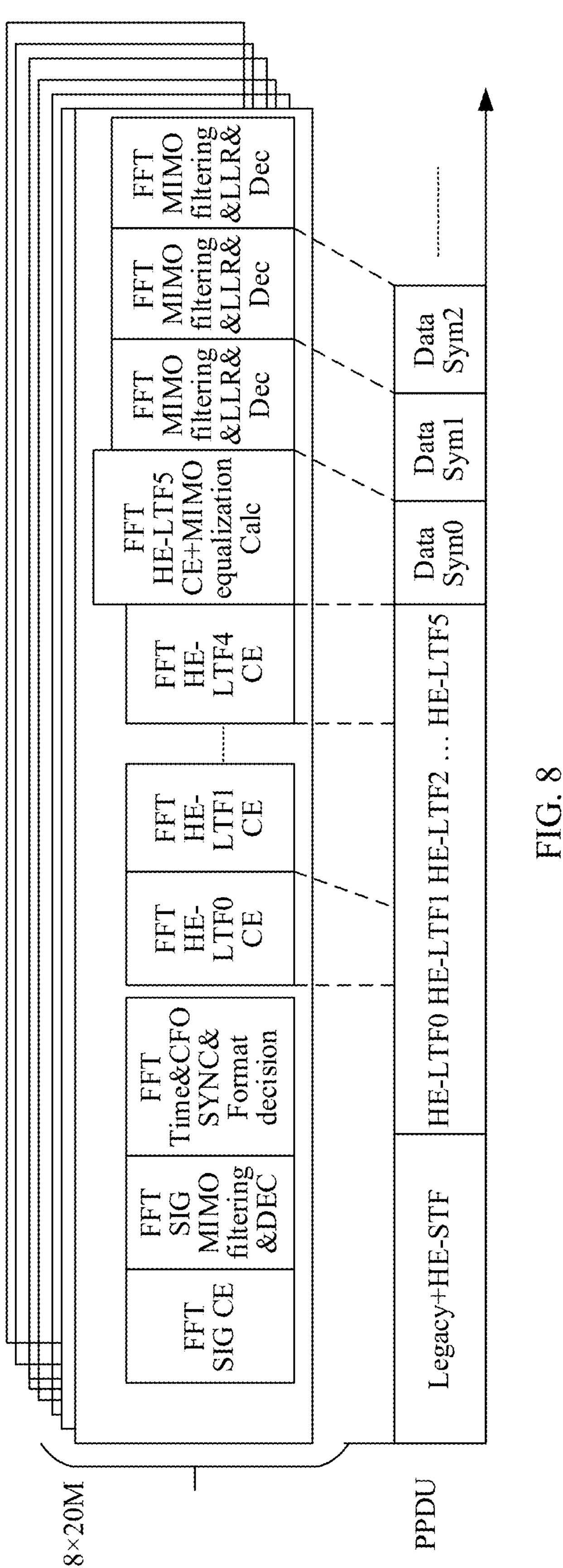
FIG. 8 is a schematic diagram of processing a received signal by another baseband processing module according to an embodiment of this disclosure.

FIG. 8 is a schematic diagram of processing a received signal by another baseband processing module according to an embodiment of this disclosure. Similar to an embodiment of this disclosure in FIG. 6, in this embodiment, after the signal is received, it is determined that the received signal is a high-specification signal (with a large antenna quantity and/or a wide bandwidth) or a long packet signal (with a long signal length or a plurality of data symbols). For example, when an HE multi-data symbol PPDU signal modulated with an 8R6SS 160M bandwidth is received, the signal may be allocated to eight soft cores for processing, and each soft core processes a 20M 8Rx received signal to reduce a processing delay of a single soft core. In addition, because there are a plurality of data symbols, a relatively long time period of tailing may be allowed for CE and MIMO calculation. In this case, a denoising CE algorithm may be used on an HE-LTF field, and a MIMO algorithm with general complexity may be used on the first data symbol.

FIG. 8 shows processing performed on the received signal in the baseband processing module of a receiver functional module according to an embodiment of this disclosure. First, parameter information of the received signal is obtained by processing a legacy-STF field and an HE-STF field.

Based on the parameter information that is of the received signal and that is obtained by processing the legacy-STF field and the HE-STF field, it is determined that the current received signal is a high-specification signal and a long packet signal, and a processing algorithm described below may be allocated to the signal.

Specifically, during reception of HE-LTF0 to HE-LTF5, denoising channel estimation processing is performed on each HE-LTF symbol to obtain a channel estimation value of each subcarrier in frequency domain. Then, MIMO filtering weights of subsequent data symbols are calculated based on channel estimation values of several HE-LTF symbols. MIMO filtering is performed on each data symbol received subsequently, and a filtering coefficient is the MIMO weight obtained through calculation based on the channel estimation value. MIMO filtering of each data symbol outputs an LLR value to hardware for bit-level de-interleaving and decoding.

In this embodiment of this disclosure, a receiver determines, based on the parameter information of the received signal, that the received signal is a high-specification signal, and then allocate a corresponding processing algorithm and/or a processing unit to the received signal, so that the receiver may meet a requirement in a high-specification signal scenario.

Figure 9:
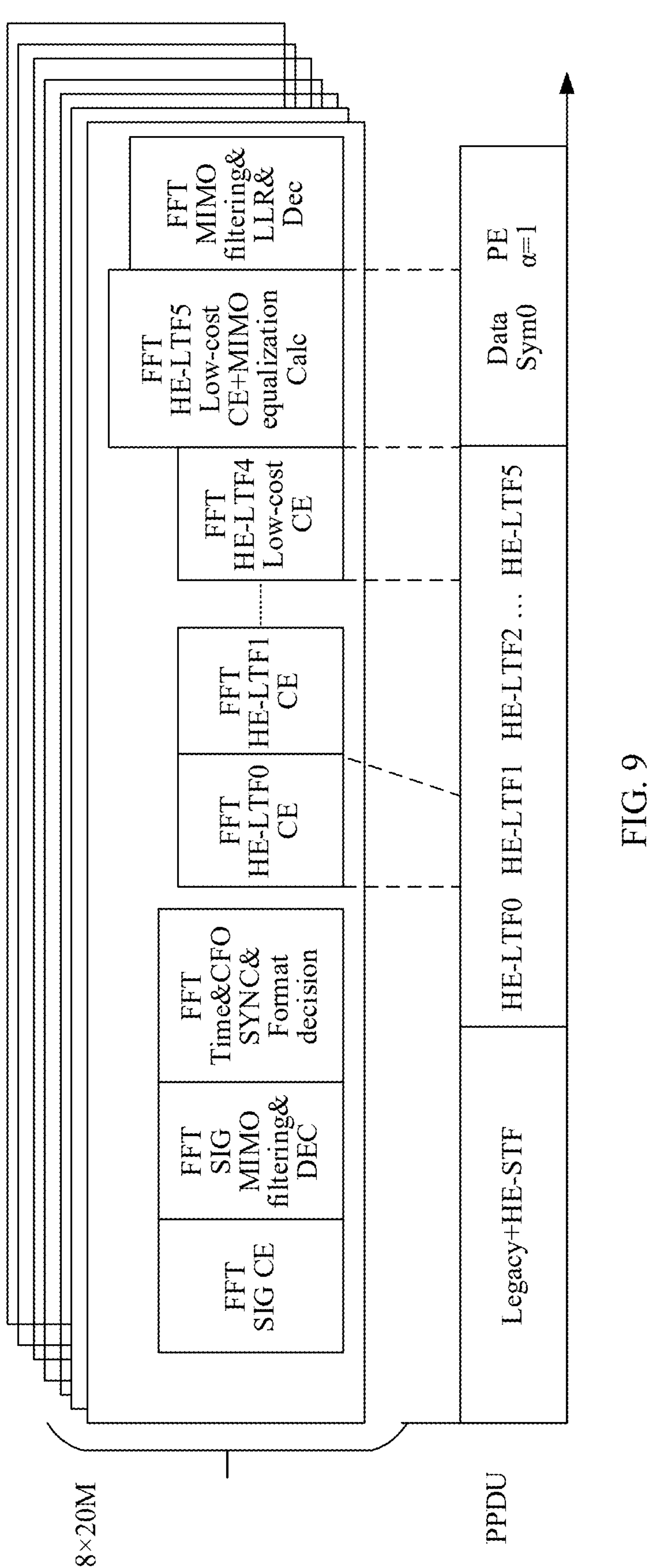
FIG. 9 is a schematic diagram of processing a received signal by another baseband processing module according to an embodiment of this disclosure.

FIG. 9 is a schematic diagram of processing a received signal by another baseband processing module according to an embodiment of this disclosure. Similar to an embodiment of this disclosure in FIG. 6, in this embodiment of this disclosure, after the signal is received, it is determined that the received signal is a high-specification signal (with a large antenna quantity and/or a wide bandwidth) and a short-packet signal (with a short signal length or a single data symbol) with a quantity of multiple users. For example, when an HE single data symbol PPDU signal that is modulated with an 8R160M bandwidth in OFDMA multi-user mode is received, the received signal may be allocated to eight soft cores for parallel processing, and each soft core processes a 20M 8Rx received signal. OFDMA needs to perform frequency-domain user-level dividing for a plurality of users in each soft core, and consequently, a degree of software parallelism is affected. In this way, when a quantity of OFDMA users exceeds a threshold, a low-cost CE algorithm and a low-cost MIMO calculation algorithm are performed on an HE-LTF to ensure that a software delay is not limited.

FIG. 9 shows processing performed on the received signal in the baseband processing module of a receiver functional module according to an embodiment of this disclosure. First, parameter information of the received signal is obtained by processing a legacy-STF field and an HE-STF field.

Based on the parameter information that is of the received signal and that is obtained by processing the legacy-STF field and the HE-STF field, it is determined that the current received signal is a multi-user, high-specification (with a large antenna quantity and/or a wide bandwidth), and short-packet signal, and a processing algorithm described below may be allocated to the signal.

Specifically, during reception of HE-LTF0 to HE-LTF5, denoising channel estimation processing is performed on a signal of a frequency band corresponding to each user in each HE-LTF symbol, and a low-cost CE algorithm is used in a channel estimation process, in other words, a channel estimation value is calculated at an interval of several subcarriers. Then, MIMO filtering weights of subsequent data symbols are calculated based on channel estimation values of several HE-LTF symbols, and linear interpolation is performed on the MIMO weights in frequency domain to obtain a MIMO weight corresponding to each subcarrier. MIMO filtering is performed on a data symbol 0 received subsequently, and a filtering coefficient is the MIMO weight obtained through calculation based on the channel estimation value and through linear interpolation. MIMO filtering of the data symbol outputs an LLR value to hardware for bit-level de-interleaving and decoding.

In this embodiment of this disclosure, the receiver determines, based on the parameter information of the received signal, that the received signal is a high-specification signal, and then allocate a corresponding processing algorithm and/or a processing unit to the received signal, so that the receiver may meet a requirement in a high-specification signal scenario.

Figure 10:
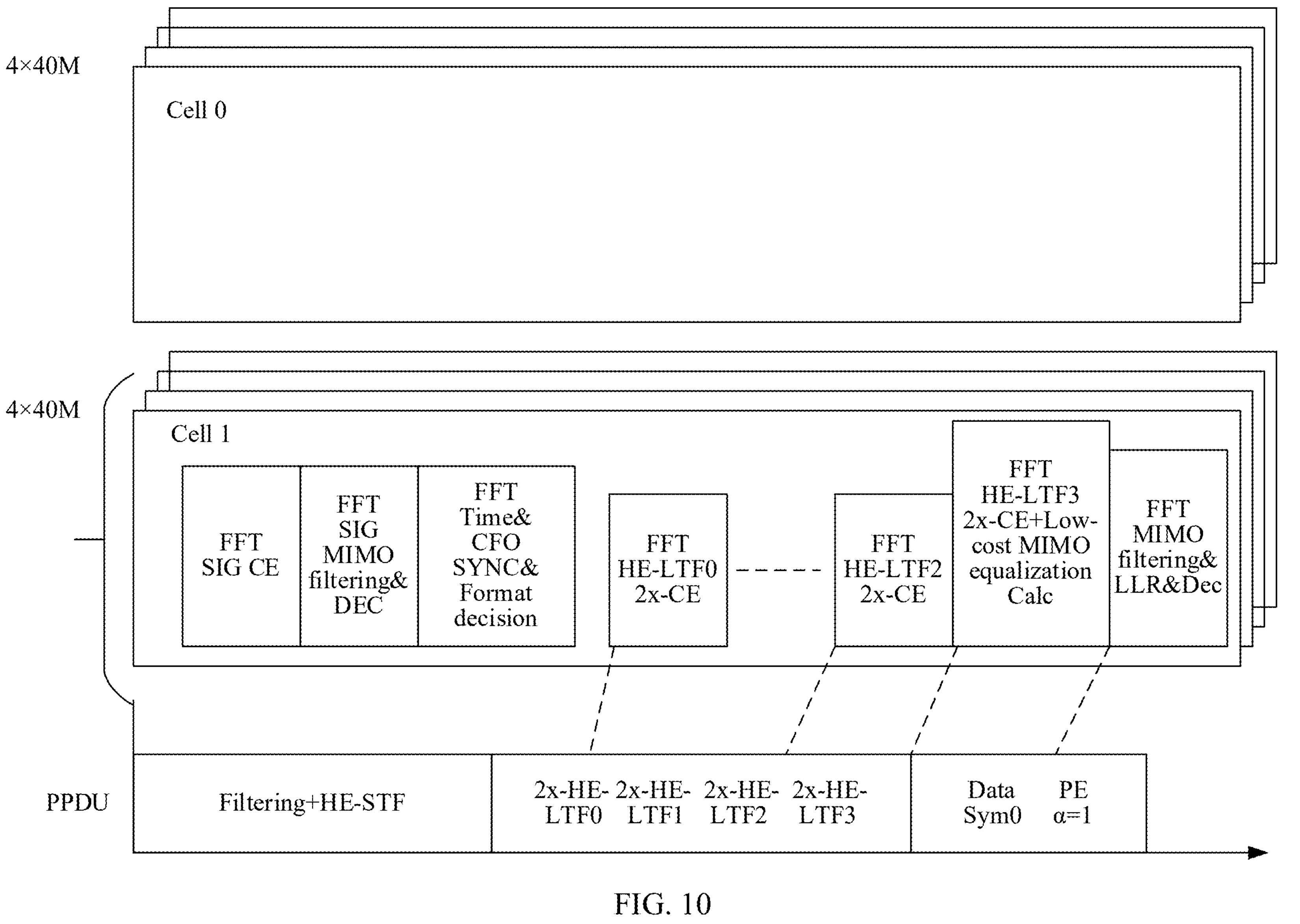
FIG. 10 is a schematic diagram of processing a received signal by another baseband processing module according to an embodiment of this disclosure.

FIG. 10 is a schematic diagram of processing a received signal by another baseband processing module according to an embodiment of this disclosure. Similar to an embodiment of this disclosure in FIG. 6, in this embodiment of this disclosure, after the signal is received, it is determined that the received signal is a signal that is with an LTF symbol HE 2×-LTF using comb ½ in frequency domain and that needs to meet an extreme delay constraint, or a signal that is in a receiving delay bottleneck scenario. For example, when HE SU PPDU signals with 2×-LTF, modulated with a 4R4SS 160M bandwidth, and from a dual cell are simultaneously received, because an HE-LTF symbol length of the HE SU 2×-LTF is halved and a signal specification (with a large antenna quantity and/or a wide bandwidth) is relatively high, the received signals may be allocated to four soft core processing units, and each soft core processing unit processes a 40M 4Rx signal. This poses a great challenge to a CE software processing delay. To ensure that the software processing delay meets a constraint, 2× channel estimation (2×-CE) is performed on the HE-LTF symbol, and 2× processing is also performed on MIMO equalization to reduce frequency of MIMO coefficient calculation.

FIG. 10 shows processing performed on the received signal in the baseband processing module of a receiver functional module according to an embodiment of this disclosure. First, parameter information of the received signal is obtained by processing a legacy-STF field and an HE-STF field.

Based on the parameter information that is of the received signal and that is obtained by processing the legacy-STF field and the HE-STF field, it is determined that the current received signal is a signal that needs to meet an extreme delay constraint, and a processing algorithm described below may be allocated to the signal.

Specifically, during reception of HE-LTF0 to HE-LTF3, denoising channel estimation processing is performed on a signal of a frequency band corresponding to each user in each HE-LTF symbol, and 2×-CE processing is used in a channel estimation process, in other words, a channel estimation value is calculated for each subcarrier. Then, MIMO filtering weights of subsequent data symbols are calculated based on channel estimation values of several HE-LTF symbols, and linear interpolation is performed on 2×MIMO weights in frequency domain to obtain a MIMO weight corresponding to each subcarrier of a 4× data symbol. MIMO filtering is performed on a data symbol 0 received subsequently, and a filtering coefficient is the MIMO weight obtained through calculation based on the channel estimation value and through linear interpolation. MIMO filtering of the data symbol outputs an LLR value to hardware for bit-level de-interleaving and decoding.

In this embodiment of this disclosure, the receiver determines, based on the parameter information of the received signal, that the received signal is a signal in a scenario in which the extreme delay constraint needs to be met, and then allocates a corresponding processing algorithm and/or a corresponding processing unit to the received signal, so that the receiver may meet a requirement of a signal in an extreme delay constraint scenario.

Figure 11:
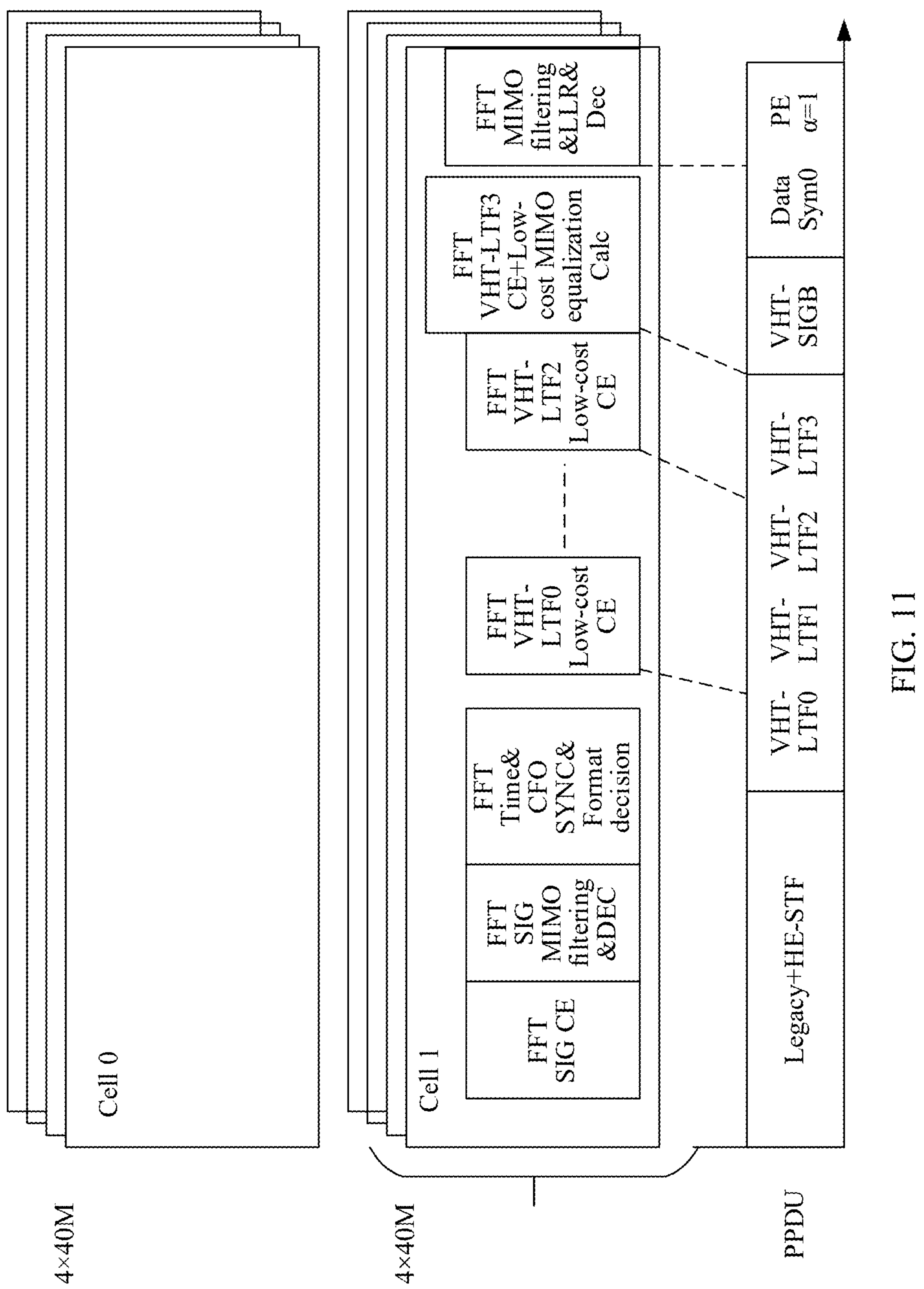
FIG. 11 is a schematic diagram of processing a received signal by another baseband processing module according to an embodiment of this disclosure.

FIG. 11 is a schematic diagram of processing a received signal by another baseband processing module according to an embodiment of this disclosure. Similar to an embodiment of this disclosure in FIG. 6, in this embodiment, after the signal is received, it is determined that the received signal is a signal that is in a VHT (short for very high throughput: IEEE 802.11ac protocol frame) format and that needs to meet an extreme delay constraint, or a signal that is in a receiving delay bottleneck scenario. For example, when VHT single symbol PPDU signals modulated with a 4R4SS 160M bandwidth and from a dual cell are received, the 160M bandwidth corresponding to the dual cell may be divided for four soft cores for processing and each soft core processes 40M 4Rx.

Because a VHT-LTF symbol of the VHT has a shorter time length than that of an HE-LTF symbol, a delay constraint is greater. In this case, low-cost channel estimation processing is used for the VHT-LTF symbol to reduce CE tailing of each symbol. In addition, by using convenience that an AP does not need to demodulate a VHT-SIGB in an uplink, a process of low-cost CE and calculating a low-cost MIMO coefficient of a VHT-LTF3 is completed during SIG-B.

FIG. 11 shows processing performed on the received signal in the baseband processing module of a receiver functional module according to an embodiment of this disclosure. First, parameter information of the received signal is obtained by processing a legacy-STF field and an HE-STF field.

Based on the parameter information that is of the received signal and that is obtained by processing the legacy-STF field and the HE-STF field, it is determined that the current received signal is a signal that needs to meet an extreme delay constraint, and a processing algorithm described below may be allocated to the signal.

Specifically, during reception of VHT-LTF0 to the VHT-LTF3, denoising channel estimation processing is performed on a signal of a frequency band corresponding to each user in each VHT-LTF symbol, and 2×-CE processing is used in a channel estimation process, in other words, a channel estimation value is calculated at an interval of one subcarrier. No processing is then performed on the VHT-SIGB during a VHT-SIGB symbol, and MIMO filtering weights of subsequent data symbols are calculated based on channel estimation values of several VHT-LTF symbols in the time interval. In addition, linear interpolation is performed on 2×MIMO weights in frequency domain to obtain a MIMO weight corresponding to each subcarrier of a 4× data symbol. MIMO filtering is performed on a data symbol 0 received subsequently, and a filtering coefficient is the MIMO weight obtained through calculation based on the channel estimation value and through linear interpolation. MIMO filtering of the data symbol outputs an LLR value to hardware for bit-level de-interleaving and decoding.

In this embodiment of this disclosure, the receiver determines, based on the parameter information of the received signal, that the received signal is a signal in a scenario in which the extreme delay constraint needs to be met, and then allocates a corresponding processing algorithm and/or a corresponding processing unit to the received signal, so that the receiver may meet a requirement of a signal in an extreme delay constraint scenario.

Figure 12:
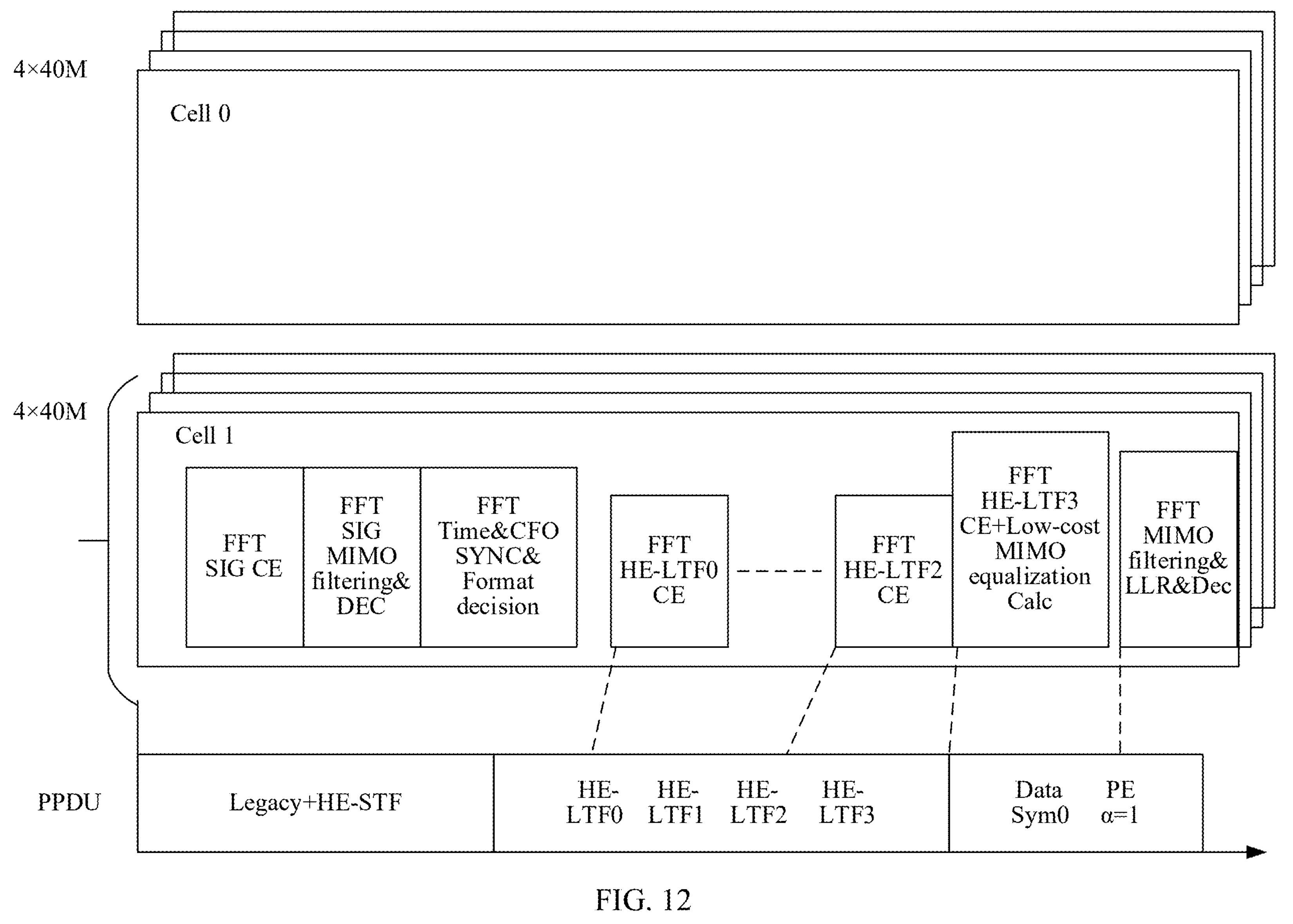
FIG. 12 is a schematic diagram of processing a received signal by another baseband processing module according to an embodiment of this disclosure.

FIG. 12 is a schematic diagram of processing a received signal by another baseband processing module according to an embodiment of this disclosure. Similar to an embodiment of the disclosure in FIG. 6, in this embodiment, after the signal is received, it is determined that the received signal is a high-specification signal (with a large antenna quantity and/or a wide bandwidth) from a dual cell. For example, HE SU/TB signals that are from a dual cell and that are respectively modulated with a 4R4SS/2+2SS 160M bandwidth are received simultaneously. For the foregoing signals, a dividing manner similar to that of the VHT format signal in FIG. 11 may be used. Specifically, the 160M bandwidth corresponding to the dual cell may be divided for four soft cores for processing, and each soft core processes 40M 4Rx.

However, because of relatively long time of an HE-LTF symbol, a low-cost non-noising algorithm needs to be used for CE of only the last symbol, and a low-cost algorithm is also used for MIMO coefficient calculation.

FIG. 12 shows processing performed on the received signal in the baseband processing module of a receiver functional module according to an embodiment of this disclosure. First, parameter information of the received signal is obtained by processing a legacy-STF field and an HE-STF field.

Based on the parameter information that is of the received signal and that is obtained by processing the legacy-STF field and the HE-STF field, it is determined that the current received signal is a high-specification signal from the dual cell, and a processing algorithm described below may be allocated to the signal.

Specifically, during reception of HE-LTF0 to HE-LTF2, each time an HE-LTF symbol is received, denoising channel estimation processing is performed on a frequency domain signal of the symbol, and in a channel estimation process, a low-cost CE algorithm is used, in other words, a channel estimation value is calculated at an interval of several subcarriers. After HE-LTF3 is received, non-noising estimation is performed on a signal of the HE-LTF symbol for calculation, and a channel estimation value is also calculated at an interval of several subcarriers. Then, MIMO filtering weights of subsequent data symbols are calculated based on the channel estimation values of several HE-LTF symbols, and linear interpolation is performed on the MIMO weights in frequency domain to obtain a MIMO weight corresponding to each subcarrier. After a data symbol 0 is received, MIMO filtering is performed on the data symbol, and a filtering coefficient is the MIMO weight obtained through calculation based on the channel estimation value and through linear interpolation. MIMO filtering of the data symbol 0 outputs an LLR value to hardware for bit-level de-interleaving and decoding.

In this embodiment of this disclosure, a receiver determines, based on the parameter information of the received signal, that the received signal is a high-specification signal, and then allocate a corresponding processing algorithm and/or a processing unit to the received signal, so that the receiver may meet a requirement in a high-specification signal scenario.

Figure 13:
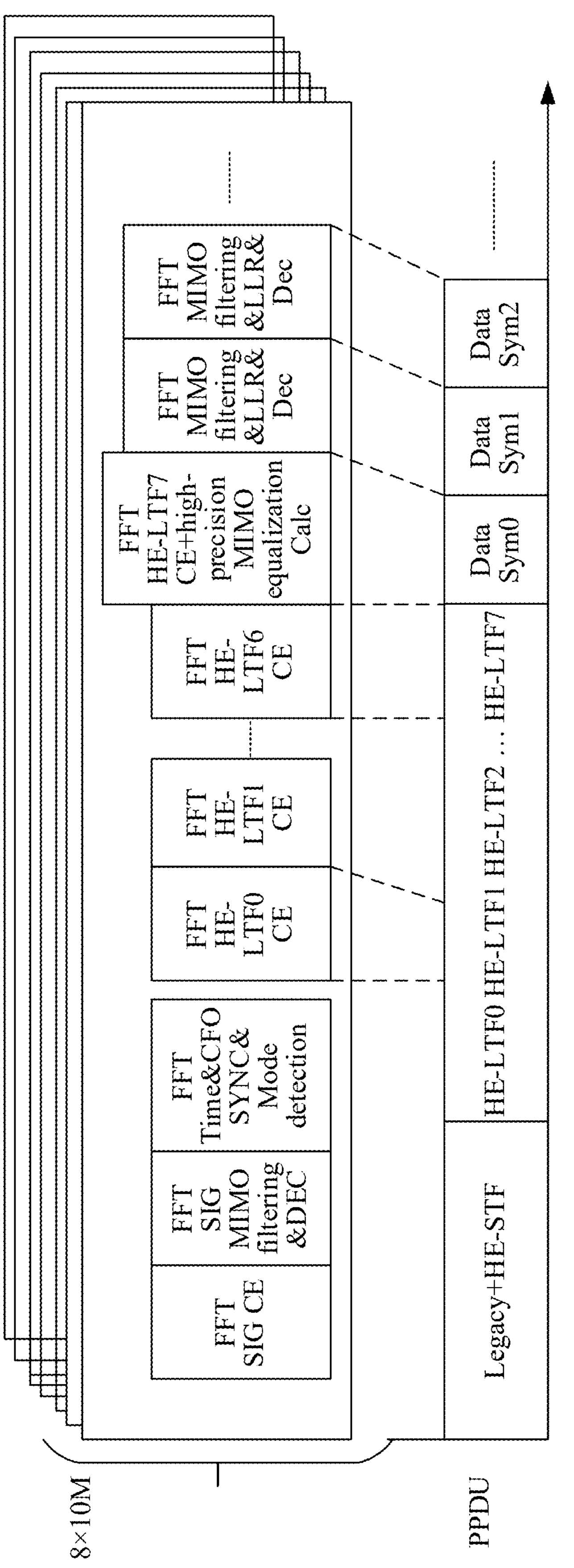
FIG. 13 is a schematic diagram of processing a received signal by another baseband processing module according to an embodiment of this disclosure.

FIG. 13 is a schematic diagram of processing a received signal by another baseband processing module according to an embodiment of this disclosure. Similar to an embodiment of the disclosure in FIG. 6, in this embodiment of this disclosure, after the signal is received, it is determined that the received signal is a signal requiring high processing precision. For example, in an AP to AP face-to-face receive and transmit scenario (AP-to-AP traffic sending at an extreme rate), an HE SU long packet PPDU signal modulated with an 8R8SS 80M bandwidth is received. The 80M bandwidth is divided for soft cores, and each soft core processes a 10M 8Rx signal to improve processing efficiency of each soft core. A denoising processing algorithm is used in channel estimation, and a high-precision algorithm is used in MIMO coefficient calculation. Tailing by several symbol lengths is allowed in MIMO coefficient calculation in a long packet.

FIG. 13 shows processing performed on the received signal in the baseband processing module of a receiver functional module according to an embodiment of this disclosure. First, parameter information of the received signal is obtained by processing a legacy-STF field and an HE-STF field.

It can be learned that, based on the parameter information that is of the received signal and that is obtained by processing the legacy-STF field and the HE-STF field, it is determined that the current received signal is a signal requiring high processing precision, and a processing algorithm described below may be allocated to the signal.

Specifically, during reception of HE-LTF0 to HE-LTF7, each time an HE-LTF symbol is received, denoising channel estimation processing is performed on a frequency domain signal of the symbol. Then, a MIMO filtering weight of each subcarrier in a subsequent data symbol is calculated based on channel estimation values of several HE-LTF symbols. MIMO filtering is performed on each data symbol received subsequently, and a filtering coefficient is the MIMO weight obtained through calculation based on the channel estimation value. MIMO filtering of each data symbol outputs an LLR value to hardware for bit-level de-interleaving and decoding.

In this embodiment of this disclosure, a processing algorithm and/or a processing soft core that can meet a high processing precision requirement are/is allocated to the received signal based on the parameter information of the received signal, so that the receiver can meet requirements of different received signals.

Figure 14:
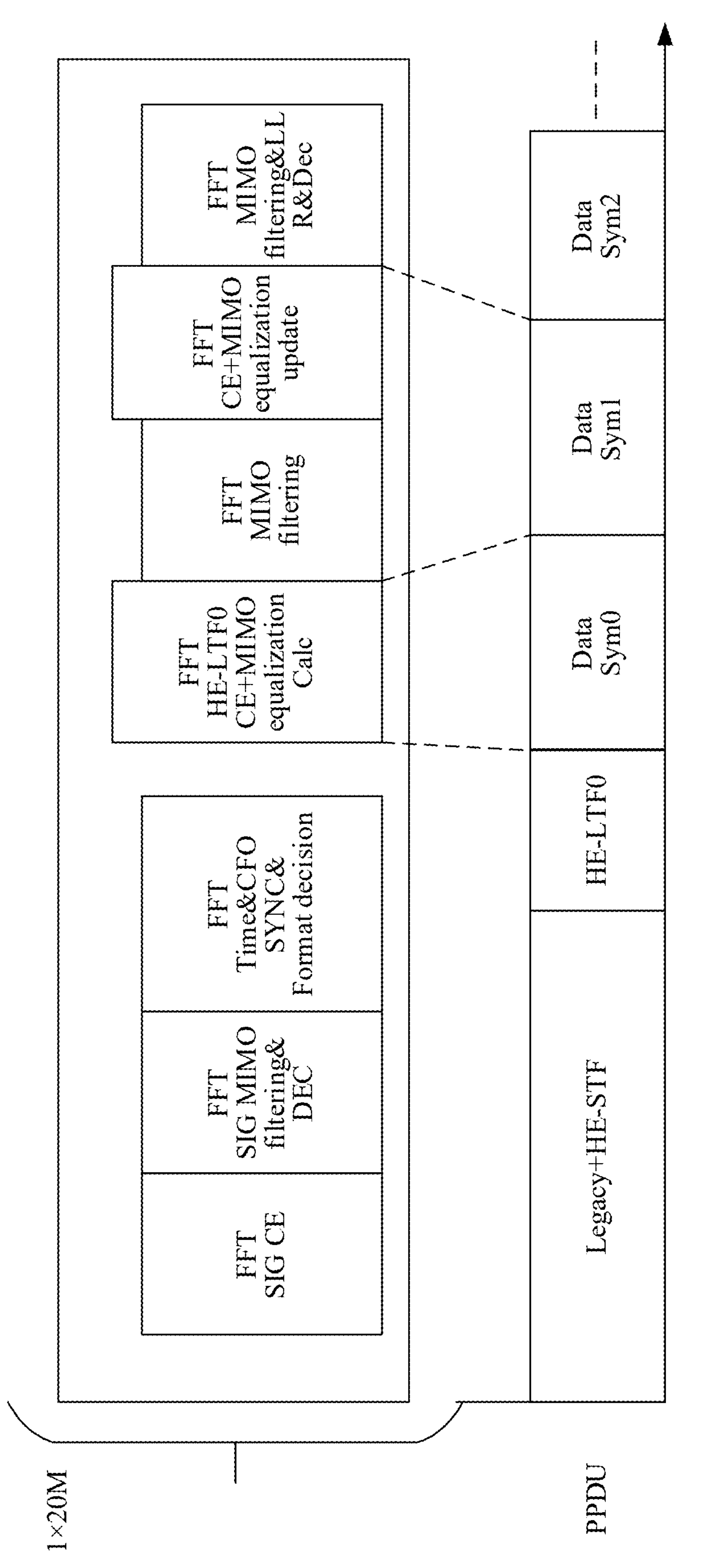
FIG. 14 is a schematic diagram of processing a received signal by another baseband processing module according to an embodiment of this disclosure.

FIG. 14 is a schematic diagram of processing a received signal by another baseband processing module according to an embodiment of this disclosure. Similar to an embodiment of the disclosure in FIG. 6, in this embodiment, after the signal is received, it is determined that the received signal is a signal with a high sensitivity requirement. For example, in a low-specification sensitivity scenario, an HE SU PPDU (where SU represents a single user (single user)) signal modulated with a 1/2/4R1SS 20M bandwidth is received. Complexity of MIMO coefficient calculation of the foregoing signal is very low, and the foregoing signal is generally a long symbol. Data can be divided every 10M and sent to each soft core for processing.

In addition to ensuring that an HE-LTF uses denoising CE processing, a channel coefficient may be reconstructed and restored based on a constellation hard decision result of a data symbol, and a channel estimation process may be repeated every several symbol periodicities to track a channel change. This meets a delay constraint and improves demodulation performance.

FIG. 14 shows processing performed on the received signal in the baseband processing module of a receiver functional module according to an embodiment of this disclosure. First, parameter information of the received signal is obtained by processing a legacy-STF field and an HE-STF field.

It can be learned that, based on the parameter information that is of the received signal and that is obtained by processing the legacy-STF field and the HE-STF field, it is determined that the current received signal is a signal with a high sensitivity requirement, and a processing algorithm described below may be allocated to the signal.

Specifically, after HE-LTF 0 is received, denoising channel estimation processing is performed on a frequency domain signal of the symbol. Then, a MIMO filtering weight of each subcarrier in a subsequent data symbol is calculated based on a channel estimation value of the HE-LTF0 symbol. MIMO filtering is performed on each data symbol received subsequently, and a filtering coefficient is the MIMO weight obtained through calculation based on the channel estimation value. MIMO filtering of each data symbol outputs an LLR value to hardware for bit-level de-interleaving and decoding.

In this embodiment of this disclosure, a processing algorithm and/or a processing soft core that can meet a high sensitivity requirement are/is allocated to the received signal based on the parameter information of the received signal, so that the receiver can meet requirements of different received signals.

Figure 15:
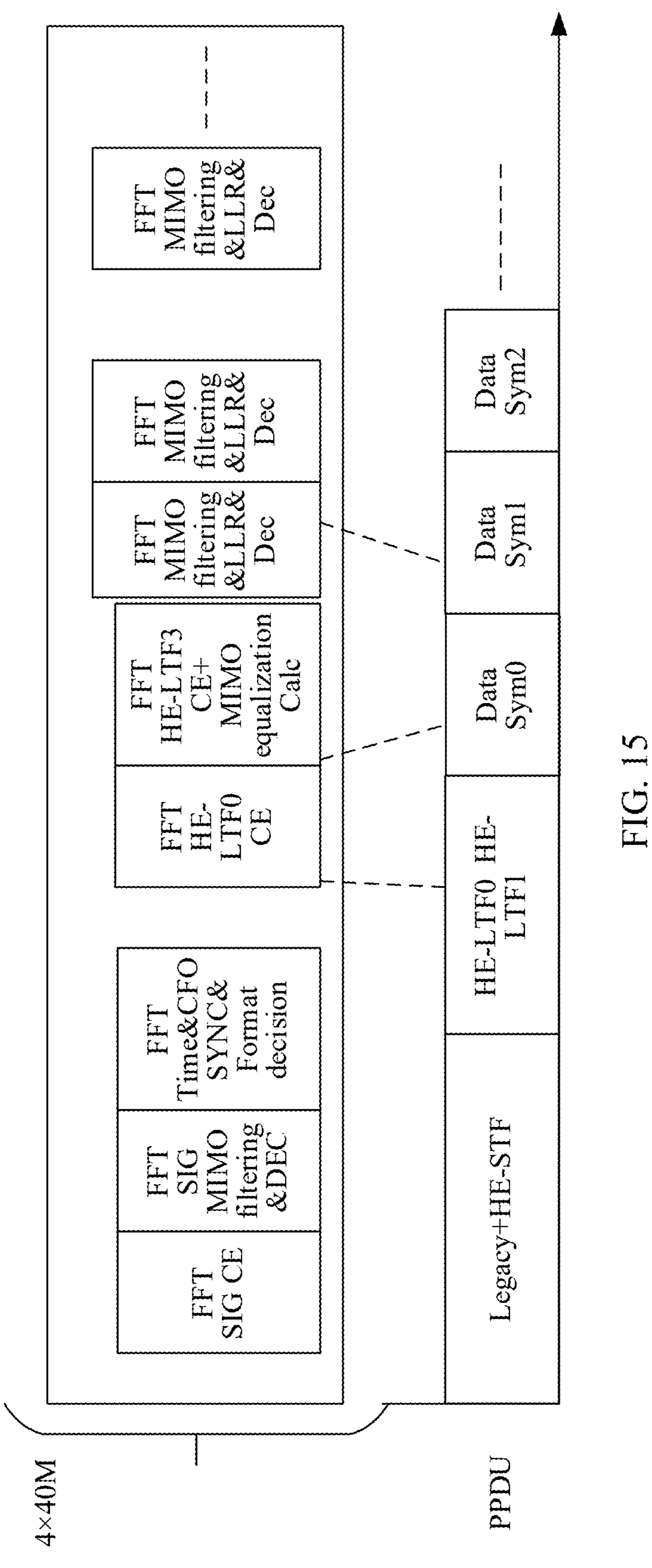
FIG. 15 is a schematic diagram of processing a received signal by another baseband processing module according to an embodiment of this disclosure.

FIG. 15 is a schematic diagram of processing a received signal by another baseband processing module according to an embodiment of this disclosure. Similar to an embodiment of the disclosure in FIG. 6, in this embodiment, after the signal is received, it is determined that the received signal is a signal requiring low power consumption. For example, when an HE SU PPDU signal modulated with a 4R2SS 40M bandwidth is received, for such a low-specification signal, the 40M bandwidth may be divided into small 10M bandwidths and allocated to four processing soft cores to improve processing efficiency of each soft core. However, to reduce power consumption and save power, the entire 40M bandwidth is sometime allocated to one soft core for processing. In this case, a delay constraint depends on a quantity of data symbols. If there is a single symbol, a delay is relatively tight, and low-cost CE and low-cost MIMO coefficient calculation need to be performed for an HE-LTF symbol. If there are a plurality of symbols, a low-cost algorithm does not need to be used.

FIG. 15 shows processing performed on the received signal in the baseband processing module of a receiver functional module according to an embodiment of this disclosure. First, parameter information of the received signal is obtained by processing a legacy-STF field and an HE-STF field.

It can be learned that, based on the parameter information that is of the received signal and that is obtained by processing the legacy-STF field and the HE-STF field, it is determined that the current received signal is a signal requiring low power consumption, and a processing algorithm described below may be allocated to the signal.

Specifically, if signaling information demodulated in a legacy part above indicates that the PPDU is with a single data symbol, after HE-LTF 0 and HE-LTF 1 are received, denoising channel estimation processing is performed on frequency domain signals of the two symbols. In addition, in a channel estimation process, a low-cost CE algorithm is adopted, in other words, a channel estimation value is calculated at an interval of several subcarriers. Then, MIMO filtering weights of subsequent data symbols are calculated based on the channel estimation values of several HE-LTF symbols, and linear interpolation is performed on the MIMO weights in frequency domain to obtain a MIMO weight corresponding to each subcarrier. MIMO filtering is performed on a data symbol 0 received subsequently, and a filtering coefficient is the MIMO weight obtained through calculation based on the channel estimation value. MIMO filtering of each data symbol outputs an LLR value to hardware for bit-level de-interleaving and decoding. If the signaling information demodulated in a legacy part above indicates that the PPDU is with a plurality of data symbols, after HE-LTF 0 and HE-LTF 1 are received, denoising channel estimation processing is performed on frequency domain signals of the two symbols. Then, a MIMO filtering weight of each subcarrier in a subsequent data symbol is calculated based on the channel estimation values of the two HE-LTF symbols. MIMO filtering is performed on each data symbol received subsequently, and a filtering coefficient is the MIMO weight obtained through calculation based on the channel estimation value. MIMO filtering of each data symbol outputs an LLR value to hardware for bit-level de-interleaving and decoding.

In this embodiment of this disclosure, a processing resource is allocated to the received signal based on the parameter information of the received signal, so that signal processing can meet a low power consumption requirement of a chip.

It should be understood that, in embodiments of this disclosure, when determining a type of the received signal based on the obtained parameter information of the received signal, the receiver functional module may perform adjustment based on an actual situation. A signal class to which the specific parameter information of the signal belongs is not limited in this disclosure.

It should be understood that a focus of embodiments of this disclosure is to allocate different processing resources to different signals in different scenarios, and process the signals based on the allocated processing resources. The allocated processing resources may include a processing unit and a processing algorithm. For various processing algorithms used in this embodiment of this disclosure, refer to the conventional technology. A specific processing algorithm used is not described in detail in this embodiment of this disclosure.

Figure 16:
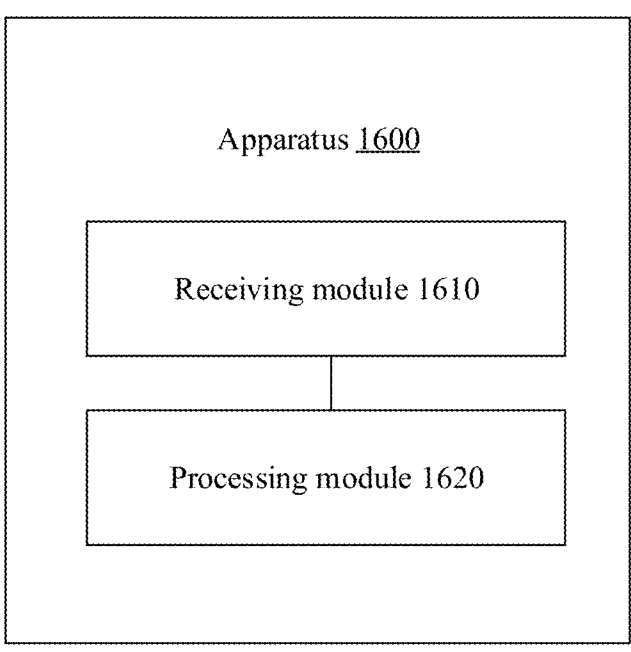
FIG. 16 is a schematic structural diagram of a communication apparatus according to an embodiment of this disclosure.

FIG. 16 is a schematic diagram of a communication apparatus according to an embodiment of this disclosure. As shown in FIG. 16, the apparatus 1600 includes a receiving module 1610 and a processing module 1620. The apparatus 1600 may be configured to implement functions of signal receiving and processing in any one of the foregoing method embodiments. For example, the apparatus 1600 may be a software baseband architecture receiver.

The apparatus 1600 may be used as a receiver to process a signal, and to perform steps of processing the first signal in the foregoing method embodiments. The receiving module 1610 may be configured to support the apparatus 1600 in performing communication, for example, performing a receiving action performed by the receiver in FIG. 5. The processing module 1620 may be configured to support the apparatus 1600 in performing a processing action in the foregoing methods, for example, performing a processing action performed by the receiver in FIG. 5. For details, refer to the following descriptions.

The receiving module is configured to receive the first signal. The processing module is configured to allocate a processing resource to the first signal based on parameter information of the first signal, where the processing resource includes a processing algorithm, and the processing algorithm includes an algorithm for channel estimation CE and/or multiple-input multiple-output MIMO detection. The processing module is further configured to perform CE and MIMO detection on the first signal based on the processing resource.

Optionally, the parameter information includes at least one of the following: a specification, a format, a quantity of data symbols, and a performance indicator of the first signal, where the specification of the first signal includes at least one of the following: a bandwidth, an antenna quantity, a cell quantity, and a user quantity, and the format of the first signal includes a protocol version of the signal.

Optionally, the processing module is specifically configured to: if it is determined, based on the parameter information, that the first signal is a signal with a small antenna quantity and a narrow bandwidth, allocate a denoising CE processing algorithm and a denoising MIMO processing algorithm to the first signal.

Optionally, the processing module is specifically configured to: if it is determined, based on the parameter information, that the first signal is a signal with a large antenna quantity and/or a wide bandwidth and with a single data symbol, allocate a non-noising CE processing algorithm or a low-cost CE processing algorithm, and a low-cost MIMO processing algorithm to the first signal; if it is determined, based on the parameter information, that the first signal is a signal with a large antenna quantity and/or a wide bandwidth and with a plurality of data symbols, allocate a denoising CE processing algorithm and a MIMO algorithm with general complexity to the first signal; if it is determined, based on the parameter information, that the first signal is a signal with a quantity of multiple users and a single data symbol, and that the first signal is a signal with a large antenna quantity and/or a wide bandwidth, allocate a low-cost CE processing algorithm and a low-cost MIMO processing algorithm to the first signal; or if it is determined, based on the parameter information, that the first signal is a signal from a dual cell, and that the first signal is a signal with a large antenna quantity and/or a wide bandwidth, allocate a first algorithm and a second algorithm to the first signal, where the first algorithm includes: a low-cost non-noising CE processing algorithm for the last symbol, and a denoising CE processing algorithm for other symbols; and the second algorithm is a low-cost MIMO processing algorithm.

Optionally, the processing module is specifically configured to: if it is determined, based on the parameter information, that the first signal is a signal that is with a long training field LTF symbol HE 2×-LTF using comb ½ in frequency domain and that needs to meet an extreme delay constraint, allocate a CE processing algorithm with 2× processing and a MIMO processing algorithm with 2× processing to the first signal; or if it is determined, based on the parameter information, that the first signal is a signal that is in a VHT format, that is from a dual cell, and that needs to meet an extreme delay constraint, allocate a low-cost CE processing algorithm and a low-cost MIMO processing algorithm to the first signal.

Optionally, the processing module is specifically configured to: if it is determined, based on the parameter information, that the first signal is a signal requiring high processing precision, allocate a denoising CE processing algorithm and a MIMO processing algorithm with high precision to the first signal.

Optionally, the processing module is specifically configured to: if it is determined, based on the parameter information, that the first signal is a signal requiring a high sensitivity, allocate a denoising CE processing algorithm and a channel tracking algorithm to the first signal.

Optionally, the processing module is specifically configured to: if it is determined, based on the parameter information, that the first signal is a signal requiring low power consumption, and when the first signal is with a single symbol, allocate a low-cost CE processing algorithm and a low-cost MIMO processing algorithm to the first signal, or when the first signal is with a plurality of symbols, allocate a CE processing algorithm with general complexity and a MIMO processing algorithm with general complexity to the first signal.

Optionally, the processing resource further includes a processing unit, and the processing module is further configured to allocate the processing unit to the first signal based on the bandwidth and the antenna quantity that are in the parameter information of the first signal.

Figure 17:
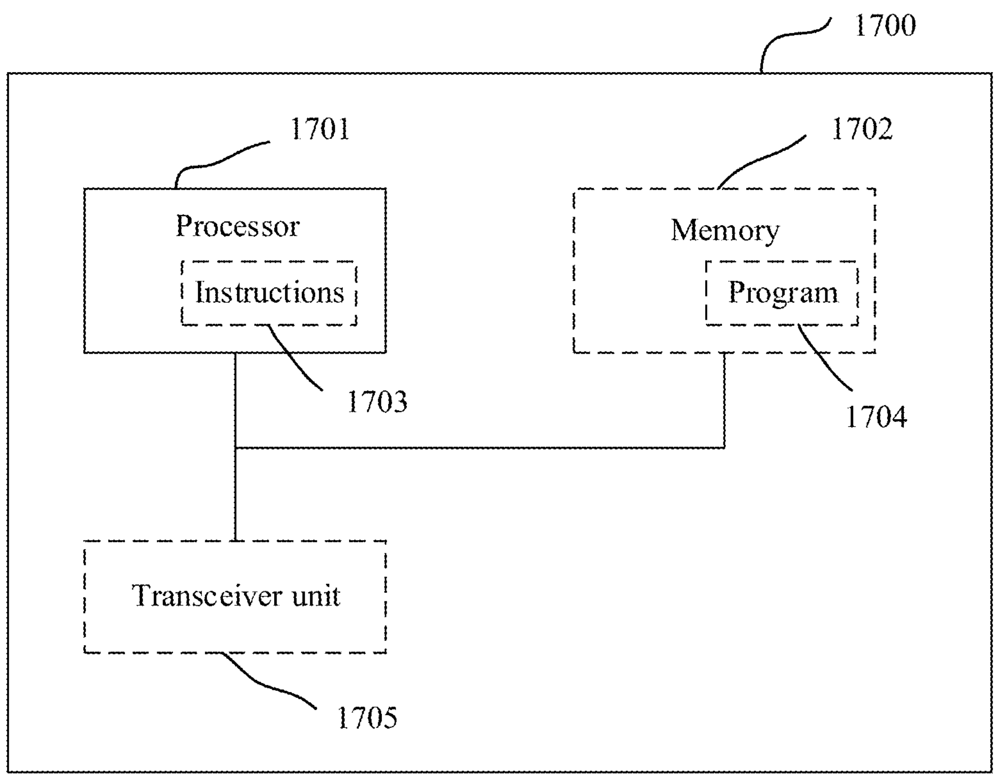
FIG. 17 is another schematic structural diagram of a communication apparatus according to an embodiment of this disclosure.

FIG. 17 is another schematic structural diagram of a communication apparatus according to an embodiment of this disclosure. The communication apparatus 1700 may be configured to implement the methods of a software baseband architecture receiver described in the foregoing method embodiments. The communication apparatus 1700 may be a chip or a network device.

The communication apparatus 1700 includes one or more processors 1701. The one or more processors 1701 may support the communication apparatus 1700 in implementing the communication method in FIG. 5. The processor 1701 may be a general-purpose processor or a dedicated processor. For example, the processor 1701 may be a central processing unit (CPU) or a baseband processor. The baseband processor may be configured to process communication data. The CPU may be configured to control the communication apparatus (for example, a network device, a terminal device, or the chip) to execute a software program and process data of the software program. The communication apparatus 1700 may further include a transceiver unit 1705, configured to input (receive) and output (send) a signal.

For example, the communication apparatus 1700 may be the chip, and the transceiver unit 1705 may be an input and/or output circuit of the chip. Alternatively, the transceiver unit 1705 may be a communication interface of the chip. The chip may be used as a component of the terminal device, the network device, or another wireless communication device.

The communication apparatus 1700 may include one or more memories 1702. The memory 1702 stores a program 1704. The program 1704 may be run by the processor 1701 to generate instructions 1703, to enable the processor 1701 to perform, according to the instructions 1703, the methods described in the foregoing method embodiments. Optionally, the memory 1702 may further store data. Optionally, the processor 1701 may further read the data stored in the memory 1702. The data and the program 1704 may be stored at a same storage address, or the data and the program 1704 may be stored at different storage addresses.

The processor 1701 and the memory 1702 may be disposed separately, or may be integrated together, for example, integrated on a board or integrated into a system-on-a-chip (SoC).

The communication apparatus 1700 may further include the transceiver unit 1705. The transceiver unit 1705 may be referred to as a transceiver machine, a transceiver circuit, or a transceiver.

It should be understood that the steps in the foregoing method embodiments may be completed by using a logic circuit in a form of hardware or instructions in a form of software in the processor 1701. The processor 1701 may be a CPU, a digital signal processor (DSP), an disclosure-specific integrated circuit (ASIC), a field programmable gate array (FPGA), or another programmable logic device, for example, a discrete gate, a transistor logic device, or a discrete hardware component.

In some embodiments provided in this disclosure, it should be understood that the disclosed apparatuses and methods may be implemented in other manners. For example, the foregoing described apparatus embodiments are merely examples. For example, division into modules is merely logical function division and there may be other division during actual implementation.

When a method in embodiments of this disclosure is implemented in a form of a software functional unit and sold or used as an independent product, the method may be stored in a computer-readable storage medium. Based on such an understanding, the technical solutions of this disclosure or a part of the technical solutions may be implemented in a form of a software product. The computer software product is stored in a storage medium, and includes several instructions for indicating a computer device (which may be a personal computer, a server, a network device, or the like) to perform all or a part of the steps of the methods described in embodiments of this disclosure. The storage medium includes at least any medium that can store program code, for example, a USB flash drive, a removable hard disk, a read-only memory (ROM), a random access memory (RAM), a magnetic disk, or an optical disc. The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A communication method, applied to a receiver, the method comprising:
- receiving a first signal;
- allocating a processing resource to the first signal based on parameter information of the first signal, wherein the processing resource comprises at least one of a processing algorithm for channel estimation (CE) or a processing algorithm for multiple-input multiple-output (MIMO) detection; and
- performing CE and MIMO detection on the first signal based on the processing resource;
- wherein allocating the processing resource to the first signal based on the parameter information of the first signal comprises one of the following:
  - (a) determining, based on the parameter information, that the first signal is a signal with a small antenna quantity and a narrow bandwidth; and allocating, based on the determination, a denoising CE processing algorithm and a denoising MIMO processing algorithm to the first signal; or
  - (b) determining, based on the parameter information, that the first signal is a signal requiring low power consumption, and
    - when the first signal is with a single symbol, allocating a low-cost CE processing algorithm and a low-cost MIMO processing algorithm to the first signal, or
    - when the first signal is with a plurality of symbols, allocating a CE processing algorithm with general complexity and a MIMO processing algorithm with the general complexity to the first signal.

2. The method according to claim 1, wherein the parameter information comprises at least one of the following:
- a specification, a format, or a quantity of data symbols of the first signal, wherein the specification of the first signal comprises at least one of the following:

a bandwidth, an antenna quantity, a cell quantity, or a user quantity, and the format of the first signal comprises a protocol version of the signal.

3. An apparatus, comprising:

at least one processor, and a memory configured to store instructions that, when executed by the at least one processor, cause the apparatus to perform operations comprising:

receiving a first signal;

allocating a processing resource to the first signal based on parameter information of the first signal, wherein the processing resource comprises at least one of a processing algorithm for channel estimation (CE) or a processing algorithm for multiple-input multiple-output (MIMO) detection; and performing CE and MIMO detection on the first signal based on the processing resource;

wherein the allocating the processing resource to the first signal based on the parameter information of the first signal comprises one of the following:

(a) determining, based on the parameter information, that the first signal is a signal to be processed with high precision, allocating a denoising CE processing algorithm and a MIMO processing algorithm with high precision to the first signal;

(b) determining, based on the parameter information, that the first signal is a signal requiring a high sensitivity, allocating a denoising CE processing algorithm and a channel tracking algorithm to the first signal; or (c) determining, based on the parameter information, that the first signal is a signal requiring low power consumption, and when the first signal is with a single symbol, allocating a low-cost CE processing algorithm and a low-cost MIMO processing algorithm to the first signal, or when the first signal is with a plurality of symbols, allocating a CE processing algorithm with general complexity and a MIMO processing algorithm with general complexity to the first signal.

4. The apparatus according to claim 3, wherein the parameter information comprises at least one of the following:

a specification, a format, or a quantity of data symbols of the first signal, wherein the specification of the first signal comprises at least one of the following:

a bandwidth, an antenna quantity, a cell quantity, or a user quantity, and the format of the first signal comprises a protocol version of the signal.

* * * * *